US012741870B2

(12) United States Patent
Gao et al.

(10) Patent No.: US 12,741,870 B2
(45) Date of Patent: Sep. 22, 2026

(54) METHOD AND SYSTEM FOR PREPARING HYDROGEN PEROXIDE

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Guohua Gao, Beijing (CN); Yanan Tian, Beijing (CN); Keyong Yang, Beijing (CN); Baoning Zong, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 718 days.

(21) Appl. No.: 18/248,794

(22) PCT Filed: Oct. 14, 2021

(86) PCT No.: PCT/CN2021/123748

§ 371 (c)(1),
(2) Date: Apr. 12, 2023

(87) PCT Pub. No.: WO2022/078427

PCT Pub. Date: Apr. 21, 2022

(65) Prior Publication Data

US 2023/0382731 A1 Nov. 30, 2023

(30) Foreign Application Priority Data

Oct. 14, 2020 (CN) ......................... 202011095895.3

(51) Int. Cl.
*C01B 15/023* (2006.01)
*B01J 19/00* (2006.01)

(52) U.S. Cl.
CPC ......... *C01B 15/023* (2013.01); *B01J 19/0053* (2013.01)

(58) Field of Classification Search
CPC .... C01B 15/023; B01J 19/0053; Y02P 20/584
See application file for complete search history.

(56) References Cited

U.S. PATENT DOCUMENTS 3,998,936 A 12/1976 Ernst et al.

FOREIGN PATENT DOCUMENTS

CA 2202435 C * 7/2008 ........... C01B 15/023
CN 1334235 A 2/2002

(Continued)

OTHER PUBLICATIONS

Shi et al. CN103449381A English (Year: 2013).*

(Continued)

*Primary Examiner* — Sally A Merkling
*Assistant Examiner* — Jordan W Taylor
(74) *Attorney, Agent, or Firm* — FINNEGAN, HENDERSON, FARABOW, GARRETT & DUNNER LLP

(57) ABSTRACT

Disclosed are a method and system for producing hydrogen peroxide, the method comprising: 1) carrying out a hydrogenation reaction on a working solution containing an alkylanthraquinone in the presence of hydrogenation catalyst particles and hydrogen, separating the resultant to obtain a circulating slurry and a hydrogenated solution, and recycling the circulating slurry; 2) dividing the hydrogenated solution into two streams, and regenerating the first stream of the hydrogenated solution to obtain a regenerated hydrogenated solution; 3) contacting the second stream of the (Continued)

hydrogenated solution and the regenerated hydrogenated solution with an oxygen-containing gas for oxidation reaction to obtain an oxidized solution; and 4) carrying out extraction separation on the oxidized solution to obtain an extract liquor containing hydrogen peroxide and a raffinate, and recycling the raffinate. The method can substantially eliminate the temperature difference of the reactor bed, effectively improve the hydrogenation selectivity, plant efficiency and hydrogenation efficiency, and prolong the service life of the hydrogenation catalyst.

20 Claims, 2 Drawing Sheets

(56) References Cited

FOREIGN PATENT DOCUMENTS

| | | | | | |
|---|---|---|---|---|---|
| CN | 1108984 | C | | 5/2003 | |
| CN | 1233451 | C | | 12/2005 | |
| CN | 101037190 | A | * | 9/2007 | |
| CN | 101177246 | A | | 5/2008 | |
| CN | 103449381 | A | * | 12/2013 | |
| CN | 104370276 | A | * | 2/2015 | ........... C01B 15/023 |
| CN | 204237558 | U | | 4/2015 | |
| CN | 105540551 | A | | 5/2016 | |
| CN | 107098317 | A | | 8/2017 | |
| CN | 108358174 | A | | 8/2018 | |
| CN | 109678119 | A | | 4/2019 | |
| CN | 109911859 | A | | 6/2019 | |
| EP | 3543209 | A1 | | 9/2019 | |
| GB | 798237 | A | | 7/1958 | |
| RU | 2220903 | C2 | | 1/2004 | |
| RU | 2616928 | C2 | | 4/2016 | |
| WO | 2013135491 | A1 | | 9/2013 | |

OTHER PUBLICATIONS

Gao et al. CN104370276A English (Year: 2015).*
Wang et al. CN101037190A English (Year: 2007).*
International Search Report and Written Opinion of International Application No. PCT/CN2021/123748, mailed Jan. 7, 2022.
Extended European Search Report in European Patent Application No. 21879470.9, dated May 27, 2025.

* cited by examiner

METHOD AND SYSTEM FOR PREPARING HYDROGEN PEROXIDE

CROSS-REFERENCE TO RELATED APPLICATIONS

This application is a national stage filing under 35 U.S.C. § 371 of International Application No. PCT/CN2021/123748, filed Oct. 14, 2021, which claims the priority to and benefits of Chinese Patent Application No. 202011095895.3, filed Oct. 14, 2020, which is incorporated herein by reference in its entirety.

TECHNICAL FIELD

The present application relates to the field of hydrogen peroxide production, particularly to a method and system for producing hydrogen peroxide.

BACKGROUND ART

Hydrogen peroxide, also referred to as oxydol, is a green chemical product, and has almost no pollution during its production and application, and thus is called a “clean” chemical product. It can be used as oxidant, bleaching agent, disinfectant, deoxidizing agent, polymer initiator and cross-linking agent, and is widely used in industries, such as chemical industry, papermaking, environmental protection, electronics, food, medicine, textile, mining industry, agricultural waste processing and the like.

Anthraquinone process is the main method for producing hydrogen peroxide in industry, and more than 99% of industrial hydrogen peroxide is produced by the anthraquinone process over the world. Existing anthraquinone processes typically comprise the steps of hydrogenation, oxidation, extraction, post-treatment of circulating working solution, etc., wherein a working solution containing an alkylanthraquinone is subjected to a hydrogenation reaction with hydrogen gas in a hydrogenation reactor filled with a catalyst to produce corresponding hydrogenated anthraquinone, and the resulting solution is called hydrogenated solution; the hydrogenated solution is subjected to an oxidation reaction in an oxidation reactor under an oxygen-containing atmosphere (such as air), so that the hydrogenated anthraquinone is restored to the original alkylanthraquinone, and hydrogen peroxide is generated at the same time, and the resulting solution is called oxidized solution; the hydrogen peroxide in the oxidized solution is extracted with pure water by means of the difference between the solubility of the hydrogen peroxide in water and in the working solution, as well as the density difference between the working solution and water, to obtain an aqueous hydrogen peroxide solution; the working solution (also called raffinate) obtained after the extraction with water is recycled after a post-treatment. The post-treatment process commonly used in China comprises decomposing $H_2O_2$ by drying with $K_2CO_3$ solution and dehydration, and separating alkali by sedimentation, and then regenerating the degradation product by adsorption in a clay bed using activated alumina.

The hydrogen peroxide production technology used in China adopts a fixed bed hydrogenation process, which has the advantages of simple operation and no need of catalyst separation, but also has many defects:

(1) there are a large temperature rise (8-10° C.) and local hot spots in the reaction bed, so that the hydrogenation efficiency is limited (6-8 g/L) and the plant efficiency is low. Compared with plants having a same scale and a higher hydrogenation efficiency, the circulating amount of the working solution and the power consumption of the pump are higher.

(2) the catalyst is easy to be deactivated and must be regenerated or replaced regularly, which not only consumes steam, but also causes loss of working solution and precious metal in the catalyst. In the fixed bed hydrogenation process currently used in China, the catalyst needs to be regenerated by steam once every 3-6 months.

(3) the working solution is easy to degrade, a large amount of activated alumina is used in industry to continuously regenerate the circulating working solution, and the activated alumina needs to be frequently replaced, so that a large amount of solid hazardous waste is generated, and a loss of working solution is encounter. For example, 5 kg of activated alumina is consumed to produce 1 ton of hydrogen peroxide product, resulting in a loss of 3 kg of working solution.

(4) the safety of the plant is poor, a potassium carbonate drying tower is needed to remove saturated moisture in the circulating working solution and promote the regeneration of the working solution. Since hydrogen peroxide may be decomposed by alkali, there is a serious potential safety hazard. Safety accidents occur in hydrogen peroxide plants every year, and 80% of the safety accidents are caused by the leakage of alkali to the oxidation unit and the extraction unit.

The slurry bed hydrogenation process can greatly improve the production efficiency of the plant, reduce the consumption of the catalyst and the circulating working solution, reduce the production cost, improve the hydrogenation efficiency (>10 g/L), and can offset the reduction of the activity of catalyst by continuously introducing and withdrawing the catalyst. Meanwhile, the slurry bed process allows a uniform hydrogenation reaction of anthraquinone, and the degradation of the working solution caused by the formation of local hot spots during the reaction process can be avoided.

Chinese patent No. CN1233451C discloses a reactor for continuous slurry bed process, which comprises one or more layers of heat exchange tube parts for heating/cooling the bed, and one or more layers of liquid-solid separator parts capable of automatic cleaning. However, the reactor has a complex structure, a large amount of supporting components are required to be arranged in the reactor, the flow pattern in the reactor is similar to plug flow, and a temperature difference still exists in the bed although a plurality of layers of heat exchange parts are arranged. The liquid-solid separator parts are arranged within the reactor, and thus are not easy to be overhauled, so that the whole plant needs to be stopped once the liquid-solid separator parts need to be disassembled and cleaned, which causes a poor flexibility.

Chinese patent No. CN1108984C discloses a method for regenerating working solution, in which at least a part of unreduced working solution is contacted with a catalyst mainly comprising γ-alumina at 40-150° C. to regenerate the by-products in the working solution. The regeneration of the working solution is carried out when it is “unreduced”, that is before hydrogenation, the γ-alumina catalyst will inevitably generate a considerable amount of fine powder which may block the filter once entering the slurry bed reactor; and the contacting of the working solution with the γ-alumina catalyst at a temperature of 40-150° C. will not only regenerate the hydrogenation byproducts, but also cause secondary side reactions, and the resulting byproducts will enter the slurry bed reactor, which may possibly influence the activity of the hydrogenation catalyst.

Chinese patent No. CN204237558U discloses a post-treatment device for hydrogen peroxide production using anthraquinone process, which comprises an alkali tower and a vacuum dryer. Chinese patent application No. CN1334235A discloses a post-treatment technology for hydrogen peroxide production using anthraquinone process, which adopts quantitative alkali injection to neutralize the acidity of the working solution returned to hydrogenation, so as to ensure the alkalinity required by hydrogenation and decompose a part of the hydrogen peroxide in the working solution; then the water is removed by vacuum drying. The above two post-treatment technologies both need to introduce alkali liquor into the system, and have the disadvantages of poor safety and serious potential safety hazard.

Accordingly, there remains a need in the art for a safe, stable, and efficient method and system for producing hydrogen peroxide.

DISCLOSURE OF THE INVENTION

It is an object of the present application to provide a method and system for producing hydrogen peroxide, which can overcome one or more of the above-mentioned deficiencies of the prior art, such as substantially eliminating the temperature difference in the reactor bed, effectively increasing the hydrogenation selectivity, the plant efficiency, and the hydrogenation efficiency, and/or extending the life of the hydrogenation catalyst; meanwhile, the system can also eliminate the serious potential safety hazard caused by the leakage of alkali, simplify the plant and effectively improve the safety of the system.

To achieve the above object, in one aspect, the present application provides a method for producing hydrogen peroxide, comprising the steps of:

1) feeding a working solution containing an alkylanthraquinone to a hydrogenation reactor and subjecting the alkylanthraquinone to a hydrogenation reaction in the presence of hydrogenation catalyst particles and hydrogen to obtain a slurry comprising a hydrogenated anthraquinone, a by-product and the hydrogenation catalyst particles, recovering the hydrogenation catalyst particles from the slurry to obtain a circulating slurry rich in hydrogenation catalyst particles and a hydrogenated solution substantially free of hydrogenation catalyst particles, and returning the circulating slurry to the hydrogenation reactor;
2) dividing the hydrogenated solution into two streams, and regenerating the first stream of the hydrogenated solution to convert at least a part of the by-product contained in the first stream of the hydrogenated solution into the alkylanthraquinone to obtain a regenerated hydrogenated solution;
3) contacting the second stream of the hydrogenated solution and the regenerated hydrogenated solution with an oxygen-containing gas for oxidation reaction to obtain an oxidized solution containing hydrogen peroxide and the alkylanthraquinone; and
4) carrying out extraction separation on the oxidized solution to obtain an extract liquor containing hydrogen peroxide and a raffinate containing the alkylanthraquinone, and returning the raffinate to the hydrogenation reactor for use as a part of the working solution;

wherein the ratio of the volume flow rate of the circulating slurry to that of the working solution was 6-20:1; and the ratio of the mass flow rate of the first stream of the hydrogenated solution to that of the second stream of the hydrogenated solution is 10-50:50-90.

Preferably, the step 1) further comprises: carrying out a first cooling on the circulating slurry to obtain a first cooled solution, and returning the first cooled solution to the hydrogenation reactor. More preferably, the temperature of the first cooled solution is 40-70° C.

In another aspect, the present application provides a system for producing hydrogen peroxide, comprising a hydrogenation unit, a regeneration unit, an oxidation unit, and a separation unit;

the hydrogenation unit is configured to conduct a hydrogenation reaction on a working solution containing an alkylanthraquinone in the presence of hydrogenation catalyst particles and hydrogen to obtain a slurry comprising a hydrogenated anthraquinone, a by-product and the hydrogenation catalyst particles, recover the hydrogenation catalyst particles from the resulting slurry to obtain a circulating slurry rich in hydrogenation catalyst particles and a hydrogenated solution substantially free of hydrogenation catalyst particles, and recycle the circulating slurry;

the regeneration unit is configured to regenerate a part of the hydrogenated solution to convert at least a part of the byproduct contained therein to the alkylanthraquinone to produce a regenerated hydrogenated solution;

the oxidation unit is configured to contact the rest part of the hydrogenated solution and the regenerated hydrogenated solution with an oxygen-containing gas for oxidation reaction to obtain an oxidized solution containing hydrogen peroxide and the alkylanthraquinone; and the separation unit is configured to carry out extraction separation on the oxidized solution to obtain an extract liquor containing hydrogen peroxide and a raffinate containing the alkylanthraquinone, and return the raffinate to the hydrogenation unit.

Compared with the prior art, the method and system of the present application have the following advantages:

1) in the present application, the circulating slurry is recycled and mixed into the working solution at a specific ratio of mass flow rate, particularly the circulating slurry is returned to the slurry bed reactor after the first cooling, so that the flow state in the reactor is close to fully mixed flow, the temperature difference in the reactor bed is substantially eliminated, and the hydrogenation selectivity, plant efficiency and hydrogenation efficiency are improved, and particularly the hydrogenation efficiency can reach 10-18 g/L;
2) in the method of the present application, the hydrogenation reaction of the alkylanthraquinone is carried out first, and then a part of the hydrogenated solution is regenerated, so that the entrance of the dust of regeneration catalyst into the slurry bed reactor and the blockage of the filter can be avoided, the reduction of the activity of the hydrogenation catalyst by secondary byproduct can be prevented, the service life of the hydrogenation catalyst can be prolonged, and the cost and loss caused by regeneration of the deactivated catalyst can be reduced;
3) in the present application, a desired regeneration effect of the working solution can be obtained by passing 10-50% by mass flow rate of the hydrogenated solution through the regeneration reactor, so that the amount of regeneration catalyst for regenerating 40-80% by mass flow rate of the working solution can be reduced while allowing the plant to operate with a high hydrogenation efficiency, the generation of waste solids can be greatly reduced, and the economical efficiency and environmental protection property of the plant can be greatly improved;

4) the method and system of the present application can completely eliminate the use of the alkali tower, and provide a full-acid environment in the plant, so that the serious potential safety hazard caused by alkali leakage in the system can be eliminated while maintaining the stability of the hydrogenation reaction in the slurry bed, thereby greatly improving the intrinsic safety of the hydrogen peroxide production plant; particularly, at least a part of the raffinate is subjected to vacuum drying to obtain a residual liquor, water and/or an organic matter for effective utilization, which is effective and environment-friendly.

Other characteristics and advantages of the present application will be described in detail in the detailed description hereinbelow.

BRIEF DESCRIPTION OF THE DRAWINGS

The drawings, forming a part of the present description, are provided to help the understanding of the present application, and should not be considered to be limiting. The present application can be interpreted with reference to the drawings in combination with the detailed description hereinbelow. In the drawings.

DETAILED DESCRIPTION OF THE INVENTION

Figure 1:
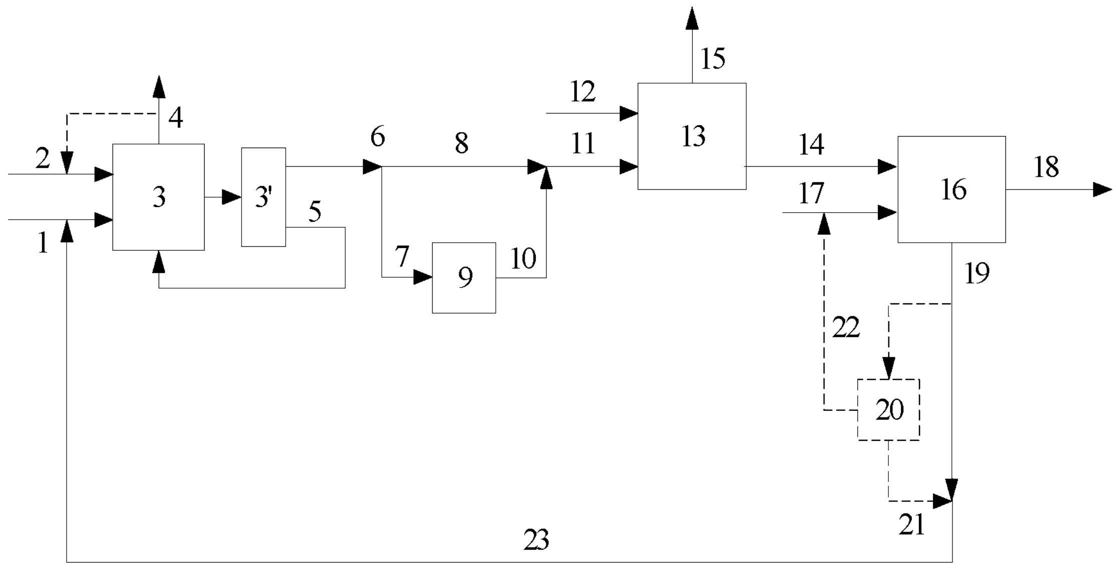
FIG. 1 is a schematic diagram of a preferred embodiment of the method and system for producing hydrogen peroxide of the present application.

The present application will be further described hereinafter in detail with reference to the drawing and specific embodiments thereof. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, for example all values within ±5% of said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the present application, unless otherwise stated, the term "hydrogenation efficiency" is expressed in terms of the ratio of the weight of hydrogen peroxide obtained after the oxidation of the hydrogenated solution to the volume of the working solution, in a unit of g/L; that is, the amount (g) of hydrogen peroxide obtained from 1 L of working solution after the completion of the oxidation process, assuming that, in the oxidation process, the conversion of the hydrogenated anthraquinone contained in the hydrogenated solution and the yield are 100%.

In the present application, unless otherwise stated, all pressures given are gauge pressures.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to the person skilled in the art that such a combination is obviously unreasonable.

All of the patent and non-patent documents cited herein, including but not limited to textbooks and journal articles, are hereby incorporated by reference in their entirety.

As mentioned above, in a first aspect, the present application provides a method for producing hydrogen peroxide, comprising the steps of:

1) feeding a working solution containing an alkylanthraquinone to a hydrogenation reactor and subjecting the alkylanthraquinone to a hydrogenation reaction in the presence of hydrogenation catalyst particles and hydrogen to obtain a slurry comprising a hydrogenated anthraquinone, a by-product and the hydrogenation catalyst particles, recovering the hydrogenation catalyst particles from the slurry to obtain a circulating slurry rich in hydrogenation catalyst particles and a hydrogenated solution substantially free of hydrogenation catalyst particles, and returning the circulating slurry to the hydrogenation reactor;

2) dividing the hydrogenated solution into two streams, and regenerating the first stream of the hydrogenated solution to convert at least a part of the by-product contained in the first stream of the hydrogenated solution into the alkylanthraquinone to obtain a regenerated hydrogenated solution;

3) contacting the second stream of the hydrogenated solution and the regenerated hydrogenated solution with an oxygen-containing gas for oxidation reaction to obtain an oxidized solution containing hydrogen peroxide and the alkylanthraquinone; and 4) carrying out extraction separation on the oxidized solution to obtain an extract liquor containing hydrogen peroxide and a raffinate containing the alkylanthraquinone, and returning the raffinate to the hydrogenation reactor for use as a part of the working solution.

According to the present application, the working solution is typically a solution prepared by dissolving an alkylanthraquinone compound in an organic solvent, wherein the alkylanthraquinone compound may be those conventionally used in the art, and there is no particular limitation in the present application. Preferably, the alkylanthraquinone compound may be at least one selected from the group consisting of 2-alkyl-9,10-anthraquinone (i.e., 2-alkylanthraquinone), 9,10-dialkylanthraquinone (i.e., dialkylanthraquinone), and corresponding 5,6,7,8-tetrahydro derivatives thereof. Further preferably, in the 2-alkyl-9,10-anthraquinone, the alkyl group may be a C1-C5 alkyl group, non-limiting examples of which include: methyl, ethyl, sec-butyl, tert-butyl, tertamyl and isoamyl; in the 9,10-dialkylanthraquinone, the two alkyl groups, being the same or different from each other, are independently selected from C1-C5 alkyl groups, for example selected from methyl, ethyl or tert-butyl. Particularly preferably, the two alkyl groups on the 9,10-dialkylanthraquinone may be 1,3-dimethyl, 1,4-dimethyl, 2,7-dimethyl, 1,3-diethyl, 2,7-di(tert-butyl) or 2-ethyl-6-tert-butyl.

According to the present application, the organic solvent used in the working solution may be those conventionally used in the art, and there is no particular limitation in the present application. In a preferred embodiment, the organic solvent is a mixture of a non-polar compound and a polar compound. Preferably, the non-polar compound may be a petroleum fraction having a boiling point higher than 140° C., and its main component is aromatic hydrocarbons of C9 or higher (i.e. heavy aromatic hydrocarbons), such as isomers of trimethylbenzene, isomers of tetramethylbenzene, tert-butylbenzene, isomers of methylnaphthalene, and isomers of dimethylnaphthalene. Preferably, the polar compound is selected from the group consisting of saturated alcohols, carboxylic acid esters, phosphoric acid esters, tetra-substituted ureas, and combinations thereof. The saturated alcohol is typically C7-C11 saturated alcohols, non-limiting examples of which include: diisobutyl carbinol, 3,5,5-trimethylhexanol, and isoheptanol. The carboxylic acid ester is, for example, at least one of methylcyclohexyl acetate, heptyl acetate, butyl benzoate and ethyl heptanoate. The phosphoric acid ester is, for example, at least one of trioctyl phosphate, tri-2-ethylbutyl phosphate, tri-2-ethylhexyl phosphate, and tri-n-octyl phosphate. The tetra-substituted urea is, for example, tetra-n-butylurea.

According to the present application, preferably, the hydrogenation catalyst may be any suspensible catalyst system conventionally used in the art, e.g. the hydrogenation catalyst may be selected from supported catalysts and/or unsupported catalysts, preferably supported catalysts. Further preferably, the supported catalyst comprises a carrier and an active metal selected from Group VIII metals, Group IB metals, Group IIB metals, or combinations thereof, preferably selected from platinum, rhodium, palladium, cobalt, nickel, ruthenium, copper, rhenium, or combinations thereof; the carrier is selected from activated carbon, silicon carbide, alumina, silicon monoxide, silica, titania, zirconia, magnesia, zinc oxide, calcium carbonate, barium sulfate or combinations thereof, and is preferably selected from alumina, silica or combinations thereof. Even more preferably, the hydrogenation catalyst has an active metal content of from 0.01 to 30 wt %, preferably from 0.01 to 5 wt %, more preferably from 0.1 to 5 wt %, based on the weight of the hydrogenation catalyst.

In a preferred embodiment, the particle diameter of the hydrogenation catalyst is in a range of 0.1 to 5000 preferably 0.1 to 500 more preferably 1 to 200 μm.

According to the present application, in step 1), the alkylanthraquinone compound in the working solution is subjected to a hydrogenation reaction with hydrogen in the presence of hydrogenation catalyst particles to obtain a slurry comprising a hydrogenated anthraquinone, a by-product and the hydrogenation catalyst particles, wherein the hydrogenated anthraquinone refers to hydrogenated products capable of generating hydrogen peroxide through oxidation, such as ethyl hydrogen anthraquinone; the by-product refers to hydrogenated products that cannot produce hydrogen peroxide through oxidation, such as tetrahydroalkylanthraquinone, octahydroalkylanthraquinone, decahydroalkylanthraquinone, alkylhydroxyanthrone, alkylanthrone and the like.

In a preferred embodiment, the hydrogenation reaction of step 1) is carried out in a slurry bed reactor to further improve the production efficiency and hydrogenation efficiency, and reduce the production cost. The specific form of the slurry bed reactor is not particularly limited in the present application, and may be, for example, mechanical stirring kettle, and other forms of reactors that provide driving force for slurry circulation by known ways such as gas lift.

In a further preferred embodiment, the conditions of the hydrogenation reaction of step 1) include: a pressure of 0.03-0.35 MPa, preferably 0.05-0.2 MPa; a temperature of ° C., preferably 45-65° C.; a ratio of the mass flow rate of the working solution to that of the hydrogenation catalyst of 25-700:1, preferably 30-500:1; a ratio of the standard volume flow rate of hydrogen to the volume flow rate of the working solution of 4-14:1, preferably 5-10:1.

In a preferred embodiment, the ratio of the volume flow rate of the circulating slurry to that of the working solution in step 1) is 6-20:1, preferably 8-18:1, more preferably 12-18:1, for example 12-15:1.

In the present application, the manner of recovering the hydrogenation catalyst particles used in step 1) is not particularly limited as long as the slurry can be separated by solid-liquid separation to obtain a hydrogenated solution, which is an organic solution containing a hydrogenated anthraquinone compound and a hydrogenated by-product with substantially no hydrogenation catalyst particles, and a circulating slurry, which is an organic slurry rich in hydrogenation catalyst particles and may have the same composition as the hydrogenated solution except for the hydrogenation catalyst particles.

According to the present application, the recovery of the hydrogenation catalyst particles used in step 1), i.e. the solid-liquid separation of the slurry, can be carried out inside or outside the hydrogenation reactor, preferably outside the hydrogenation reactor. In a preferred embodiment, the solid-liquid separation of the slurry is carried out in a filter outside the hydrogenation reactor, more preferably in an automatic backwashing filter.

In a further preferred embodiment, 2 to 50, preferably 4 to 40, of the automatic backwashing filters can be used. Where a plurality of filters are provided, the operation is more convenient, the installation and maintenance are also convenient, and a long-term stable operation of the slurry bed reactor can be achieved. Preferably, each filter is independently provided with a filter pressure difference detector and an automatic back flushing switching valve, so that an alternate online automatic back flushing of multiple filters can be realized by means of the filter pressure difference.

According to the present application, the filter medium used in the automatic backwashing filter may be made of any known filter material such as ceramic, porous metal such as sintered stainless steel or other materials. The filter medium should have such a pore size that does not allow the hydrogenation catalyst particles to pass through, and therefore the pore size is dependent on the average particle size and particle size distribution of the hydrogenation catalyst particles. For example, the pore size of the filter medium may be in a range of 0.1 to 200 μm, preferably 0.5 to 100 μm, more preferably 0.5 to 50 μm.

According to the present application, the backflushing fluid used by the automatic backwashing filter may be a liquid or a gas, preferably a liquid. For example, the liquid may be a fresh working solution and/or a filtered hydrogenated solution, preferably the filtered hydrogenated solution.

In a preferred embodiment, the hydrogenation reaction in step 1) also produces a hydrogen-containing tail gas, i.e. the hydrogen-containing gas remaining after the hydrogenation reaction, and the step 1) further comprises discharging the hydrogen-containing tail gas and/or compressing the hydrogen-containing tail gas and then returning it to the hydrogenation reactor, preferably compressing the hydrogen-containing tail gas and then returning it to the hydrogenation reactor, for example compressing the hydrogen-containing tail gas and then returning it to the hydrogen feed.

In the present application, to further reduce the bed temperature of the hydrogenation reactor, the temperature of the circulating slurry may be adjusted to be the same as the temperature of the hydrogenation reaction. In a preferred embodiment, the step 1) further comprises: carrying out a first cooling on the circulating slurry to obtain a first cooled solution, and returning the first cooled solution to the hydrogenation reactor; further preferably, the temperature of the first cooled solution is 40 to 70° C., preferably to 65° C.

According to the present application, in step 2), the first stream of the hydrogenated solution (also referred to as Solution A for short herein) is contacted with a regeneration catalyst for reaction, and at least a part of the byproduct generated by the hydrogenation reaction of the alkylanthraquinone in the Solution A is regenerated and converted into the alkylanthraquinone compound, so as to obtain a regenerated hydrogenated solution.

In a preferred embodiment, the ratio of the mass flow rate of the first stream of the hydrogenated solution (i.e. the Solution A) to that of the second stream of the hydrogenated solution (also referred to as Solution B for short herein) is 10-50:50-90, more preferably 15-40:60-85, even more preferably 15-30:70-85, for example 15-25:75-85. The use of the specific ratio of the mass flow rate of the Solution A to that of the Solution B is favorable for ensuring the regeneration efficiency of the working solution, ensuring a long-term stable operation of the plant with high hydrogenation efficiency, reducing the amount of regeneration catalyst used for regeneration of the working solution and reducing the generation of waste solids.

In a preferred embodiment, the regeneration reaction of step 2) is carried out in a regeneration reactor selected from fixed bed reactor, slurry bed reactor or a combination thereof.

According to the present application, the regeneration catalyst may be any of those regeneration catalysts conventionally used in the art, and there is no particular limitation herein, as long as the Solution A can be converted into a regenerated hydrogenated solution. Preferably, the regeneration catalyst is selected from modified alumina, modified molecular sieves, or a combination thereof. In a preferred embodiment, where the regeneration reactor is a fixed bed reactor, the regeneration catalyst is a modified alumina, which may be an alumina modified with at least one metal selected from alkali metals, alkaline earth metals, and rare earth metals; where the regeneration reactor is a slurry bed reactor, the regeneration catalyst is a modified molecular sieve, which may be a molecular sieve modified with at least one metal selected from alkali metals, alkaline earth metals and rare earth metals.

In a preferred embodiment, the conditions of the regeneration reaction include: a temperature of 60-120° C., preferably 80-100° C.; a pressure of 0.05-0.5 MPa, preferably 0.05-0.3 MPa; a mass ratio of the Solution A to the regeneration catalyst of 0.1-10:1, preferably 0.3-5:1. The above preferred reaction conditions are favorable for promoting the regeneration of the Solution A.

In a further preferred embodiment, to satisfy the conditions of the regeneration reaction, the step 2) further comprises: exchanging heat between the Solution A and at least a part of the regenerated hydrogenated solution to obtain a heat exchanged solution, and then carrying out a regeneration reaction on the resulting heat exchanged solution; in the heat exchange process, the Solution A is heated, the regenerated hydrogenated solution is cooled, and the heat exchanged solution refers to the heated Solution A.

In a still further preferred embodiment, the step 2) further comprises: heating the heat exchanged solution and then carrying out the regeneration reaction. In the present application, the Solution A is subjected to heat exchange and heating to allow the Solution A to reach the regeneration reaction conditions, so that the steam consumption can be saved.

In a preferred embodiment, the oxygen content in the oxygen-containing gas used in step 3) is from 20 to 100% by volume. For example, the oxygen-containing gas may be selected from oxygen, air, or a mixture of oxygen and an inert gas, which may be at least one selected from nitrogen, helium, argon, and neon, preferably nitrogen. Particularly preferably, the oxygen-containing gas is air.

According to the present application, in step 3), the Solution B and the regenerated hydrogenated solution are contacted with oxygen in the oxygen-containing gas for reaction, wherein the hydrogenated anthraquinone is oxidized to obtain the alkylanthraquinone and hydrogen peroxide, and thus obtain the oxidized solution.

In a preferred embodiment, the oxidation reaction of step 3) is carried out in an oxidation reactor, which may be selected from the group consisting of bubble column, packed column, plate column and stirred tank.

In a preferred embodiment, the conditions of the oxidation reaction of step 3) include: a temperature of 30-60° C., preferably 40-55° C.; a pressure of 0.1-0.5 MPa, preferably 0.2-0.5 MPa. The preferable reaction conditions are more favorable for the oxidation reaction of the hydrogenated solution and the increase of the content of hydrogen peroxide in the oxidized solution.

In a preferred embodiment, to satisfy the conditions of the oxidation reaction, the step 3) further comprises: before the oxidation reaction, combining the Solution B and the regenerated hydrogenated solution to obtain a mixed solution, and carrying out a second cooling on the mixed solution to obtain a second cooled solution. Preferably, the temperature of the second cooled solution is 40 to 55° C., preferably 40 to 50° C.

According to the present application, to avoid the decomposition of hydrogen peroxide during oxidation, the mixed solution obtained by combining the Solution B and the regenerated hydrogenated solution or the second cooled solution is preferably subjected to an oxidation reaction under slightly acidic conditions. In a preferred embodiment, the step 3) further comprises: before the oxidation reaction, mixing the mixed solution or the second cooled solution with a first pH regulator to obtain a regulated solution, wherein the first pH regulator can be selected from organic acids, inorganic acids or a combination thereof, and is preferably an inorganic acid. The inorganic acid is preferably selected from phosphoric acid, hydrochloric acid, sulfuric acid, nitric acid or a combination thereof, more preferably phosphoric acid. Further preferably, the acid content in the regulated solution is 1-10 mg/L, preferably 3-7 mg/L. In the present application, there is no particular limitation to the amount of the first regulator used, as long as the acid content in the regulated solution can satisfy the above requirements.

In a further preferred embodiment, the first pH regulator is present in the form of an aqueous solution, and further preferably the mass concentration of the inorganic acid and/or the organic acid in the aqueous solution of the first pH regulator is 40 to 90%.

In a preferred embodiment, the step 3) further comprises: filtering the mixed solution obtained by combining the Solution B and the regenerated hydrogenated solution, the second cooled solution or the regulated solution before the oxidation reaction. The purpose of the filtering is to remove the fine catalyst particles contained in the hydrogenated solution entering the oxidation reactor, particularly the hydrogenation catalyst particles formed by attrition, to ensure that the amount of solid particles in the solution does not exceed 10 mg/L, and in turn to ensure the safety of the oxidation reactor.

In a preferred embodiment, the oxidation reaction in step 3) further produces an oxygen-containing tail gas, that is the oxygen-containing gas remaining after the oxidation reaction, and the step 3) further comprises discharging the oxygen-containing tail gas and/or compressing the oxygen-containing tail gas and returning it to the oxidation reactor, preferably discharging the oxygen-containing tail gas directly after tail gas treatment. For example, the tail gas treatment may be carried out by recovering organic matters by means of condensation, carbon fiber adsorption, or the like, or may be carried out by direct combustion.

According to the present application, in step 4), the oxidized solution is contacted with an extractant for liquid-liquid extraction to obtain an extract liquor containing hydrogen peroxide and a raffinate containing the alkylanthraquinone. Preferably, the extractant is water and the extract liquor is an aqueous hydrogen peroxide solution.

In a preferred embodiment, the extraction of step 4) is carried out in an extraction column.

According to the present application, the oxidized solution is preferably extracted under slightly acidic conditions to avoid the decomposition of hydrogen peroxide during extraction. In a preferred embodiment, the extractant used in step 4) comprises water and a second pH regulator selected from organic acids, inorganic acids or a combination thereof, preferably an inorganic acid. The inorganic acid is preferably selected from phosphoric acid, hydrochloric acid, sulfuric acid, nitric acid or a combination thereof, more preferably phosphoric acid.

In a further preferred embodiment, the acid content in the extractant is 100-200 ppm, preferably 120-180 ppm. In the present application, the amount of the second pH regulator is not particularly limited, as long as the acid content in the extractant can satisfy the above requirements.

In a preferred embodiment, the second pH regulator is present in the form of an aqueous solution, in which the mass concentration of the inorganic acid and/or the organic acid is 40 to 90%.

In a preferred embodiment, the conditions of the extraction include: a temperature of 25-60° C., preferably 40-50° C.; a pressure of 0.01 to 0.15 MPa, preferably 0.05 to 0.12 MPa.

In a preferred embodiment, to satisfy the conditions of the extraction, the step 4) further comprises: before the extraction, carrying out a third cooling on the oxidized solution to obtain a third cooled solution. Preferably, the temperature of the third cooled solution is 40-55° C., preferably 40-50° C.

According to the present application, the raffinate obtained in step 4) can be recycled to the step 1) for use as a part of the working solution for hydrogenation reaction. In a preferred embodiment, the step 4) further comprises: vacuum drying at least 10% by mass flow rate of the raffinate to obtain a residual liquor, and returning the residual liquor and the rest of the raffinate to the hydrogenation reactor; further preferably, vacuum drying at least 30% by mass flow rate of the raffinate.

In the present application, where the raffinate is returned to the hydrogenation reactor, the circulating working solution refers to the raffinate; and where at least 10% by mass flow rate of the raffinate is vacuum dried, and the resulting residual liquor and the rest of the raffinate are returned to the hydrogenation reactor, the circulating working solution refers to the residual liquor and the rest of the raffinate.

In a further preferred embodiment, in step 4), the at least a part of the raffinate is heated and then vacuum dried, or the at least a part of the raffinate is heat-exchanged with the circulating working solution, then heated by a heater, and finally vacuum dried.

In a further preferred embodiment, the vacuum drying is carried out in a vacuum drying column, wherein the vacuum drying column may be any known form of column or knock-out drum, such as packed column, sieve plate column or the like. Further preferably, the conditions of the vacuum drying include: a temperature of 45-120° C., preferably 45-100° C.; a pressure of −100 kPa to −50 kPa, preferably −98 kPa to −81 kPa, more preferably −98 kPa to −86 kPa.

In a further preferred embodiment, the vacuum drying also produces water and/or an organic matter, and to further save the consumption of the extractant, the step 4) further comprises recycling the water and/or the organic matter. Due to the effective utilization of the water and/or organic matter removed by vacuum drying, no material loss is caused, and no wastewater is generated, so that the method is effective and environment-friendly.

The inventors of the present application have found that by adopting a specific ratio of the volume flow rate of the circulating slurry to that of the working solution, in combination with a regeneration reaction of a part of the hydrogenated solution (i.e. the Solution A), adopting a specific ratio of the mass flow rate of the part of the hydrogenated solution to that of the rest of the hydrogenated solution (i.e. the Solution B), i.e. the ratio of the mass flow rate of the Solution A to that of the Solution B, and returning the raffinate to the hydrogenation reaction, particularly by vacuum drying at least 10% by mass flow rate of the raffinate, and returning the resulting residual liquor to the hydrogenation reaction, it is favorable to the improvement of the reaction selectivity and the production efficiency of the plant, so that a hydrogenation efficiency as high as 10-18 g/L can be achieved; the service life of the hydrogenation catalyst can be prolonged, and the cost and loss caused by regeneration of the deactivated catalyst can be reduced; the intrinsic safety of the hydrogen peroxide production plant, the environmental protection property and the efficiency can be improved, while ensuring the stability of the hydrogenation reaction in the slurry bed.

In a second aspect, the present application provides a system for producing hydrogen peroxide, comprising a hydrogenation unit, a regeneration unit, an oxidation unit, and a separation unit;

the hydrogenation unit is configured to conduct a hydrogenation reaction on a working solution containing an alkylanthraquinone in the presence of hydrogenation catalyst particles and hydrogen to obtain a slurry comprising a hydrogenated anthraquinone, a by-product and the hydrogenation catalyst particles, recover the hydrogenation catalyst particles from the resulting slurry to obtain a circulating slurry rich in hydrogenation catalyst particles and a hydrogenated solution substantially free of hydrogenation catalyst particles, and recycle the circulating slurry;

the regeneration unit is configured to regenerate a part of the hydrogenated solution to convert at least a part of the byproduct contained therein to the alkylanthraquinone to produce a regenerated hydrogenated solution;

the oxidation unit is configured to contact the rest part of the hydrogenated solution and the regenerated hydrogenated solution with an oxygen-containing gas for oxidation reaction to obtain an oxidized solution containing hydrogen peroxide and the alkylanthraquinone; and the separation unit is configured to carry out extraction separation on the oxidized solution to obtain an extract liquor containing hydrogen peroxide and a raffinate containing the alkylanthraquinone, and return the raffinate to the hydrogenation unit.

In a preferred embodiment, the hydrogenation unit is provided with a working solution inlet, a hydrogen-containing gas inlet, a hydrogenated solution outlet and optionally a hydrogen-containing tail gas outlet; the regeneration unit is provided with a hydrogenated solution inlet and a regenerated hydrogenated solution outlet; the oxidation unit is provided with a hydrogenated solution inlet, an oxygen-containing gas inlet, an oxidized solution outlet and an oxygen-containing tail gas outlet; the separation unit is provided with an oxidized solution inlet, an extractant inlet, an extract liquor outlet and a raffinate outlet; wherein the hydrogenated solution outlet of the hydrogenation unit is respectively communicated with the hydrogenated solution inlets of the regeneration unit and the oxidation unit, the regenerated hydrogenated solution outlet of the regeneration unit is communicated with the hydrogenated solution inlet of the oxidation unit, the oxidized solution outlet of the oxidation unit is communicated with the oxidized solution inlet of the separation unit, and the raffinate outlet is communicated with the working solution inlet of the hydrogenation unit.

In a preferred embodiment, the hydrogenation unit comprises a hydrogenation reactor in the form of a slurry bed reactor and a filter, and the hydrogenation reactor comprises a reaction zone and a gas-liquid separation zone and has a working solution inlet, at least one hydrogen-containing gas inlet, a circulating slurry inlet, a slurry outlet and a hydrogen-containing tail gas outlet. The working solution, the circulating slurry and the hydrogen are introduced into a reaction cylinder (namely a reaction zone) of the hydrogenation reactor through corresponding inlets, and contacted with hydrogenation catalyst particles in the reaction cylinder for hydrogenation reaction, where the alkylanthraquinone is hydrogenated into hydrogenated anthraquinone, and the resulting stream flows upwards at the same time; the reaction stream flows into the gas-liquid separation zone from the opening at the top of the reaction cylinder, after the gas-liquid separation, a slurry comprising the hydrogenated anthraquinone, a byproduct and hydrogenation catalyst particles is discharged from the slurry outlet, after the hydrogen-containing tail gas is discharged from the hydrogen-containing tail gas outlet at the top of the gas-liquid separation zone, the hydrogen-containing tail gas is optionally passed to a gas supercharging equipment after being cooled for supercharging, and then returned to one hydrogen-containing gas inlet. The slurry from the slurry bed reactor is filtered in the filter, and the resulting clear solution is withdrawn from the hydrogenation unit through the hydrogenated solution outlet; the circulating slurry discharged from the circulating slurry outlet of the filter is returned to the reaction cylinder of the reactor as external circulation to further participate in the reaction. More preferably, the hydrogenation reactor further comprises a preliminary solid-liquid separation zone, and the slurry is subjected to preliminary separation in the preliminary solid-liquid separation zone, and then passed to the filter from the slurry outlet for further separation.

In a further preferred embodiment, the hydrogenation unit further comprises a compressor, the compressor is connected between the hydrogen-containing tail gas outlet of the hydrogenation reactor and one hydrogen-containing gas inlet of the hydrogenation reactor, or the compressor is connected between the hydrogen-containing tail gas outlet of the hydrogenation reactor and one hydrogen-containing tail gas inlet of the hydrogenation reactor for compressing the hydrogen-containing tail gas and recycling it to the hydrogenation reactor.

In a further preferred embodiment, the hydrogenation unit further comprises a first cooler, and the first cooler is connected between the circulating slurry outlet of the filter and the circulating slurry inlet of the hydrogenation reactor for carrying out the first cooling on the circulating slurry to obtain a first cooled solution, and recycling the first cooled solution to the hydrogenation reactor.

In a preferred embodiment, the regeneration unit comprises a regeneration reactor having a hydrogenated solution inlet and a regenerated hydrogenated solution outlet corresponding to the hydrogenated solution inlet and the regenerated hydrogenated solution outlet of the regeneration unit.

In a further preferred embodiment, the regeneration unit further comprises a heat exchanger, the heat exchanger is connected between the hydrogenated solution outlet of the hydrogenation unit, the hydrogenated solution inlet of the regeneration reactor and the regenerated hydrogenated solution outlet of the regeneration reactor for conducting heat exchange between the hydrogenated solution to be regenerated (i.e. the Solution A) and the regenerated hydrogenated solution.

In a further preferred embodiment, the regeneration unit further comprises a heater, and the heater is connected between the hydrogenated solution outlet of the heat exchanger and the hydrogenated solution inlet of the regeneration reactor for heating the hydrogenated solution after heat exchange.

In a preferred embodiment, the oxidation unit comprises an oxidation reactor having a hydrogenated solution inlet, an oxygen-containing gas inlet, an oxidized solution outlet, and an oxygen-containing tail gas outlet corresponding to the hydrogenated solution inlet, the oxygen-containing gas inlet, the oxidized solution outlet, and the oxygen-containing tail gas outlet of the oxidation unit.

The oxidation reactor may be any known type of reactor, such as stirred tank, packed column, and plate column. In the oxidation reactor, a gas-liquid distributing device such as filler, sieve plate, gas distributor, liquid distributor and the like may be provided. The gas-liquid contact mode in the oxidation reactor may be concurrent flow, or may be countercurrent flow or cross flow.

According to the present application, the oxidation reactor may be one or more than one. Where there are a plurality of oxidation reactors, the stream to be oxidized may be fed into the plurality of oxidation reactors in series or in parallel, and the oxygen-containing gas may also be fed into the plurality of oxidation reactors in series or in parallel.

In the present application, the oxidation reactor may be provided with an internal or external heat exchanger, or a heat exchanger may be provided between a plurality of oxidation reactors, to take away the reaction heat generated during the oxidation reaction to avoid the occurrence of overtemperature in the oxidation reactor. The oxidation reactor may be provided with an internal or external gas-liquid separator for separating the oxidized solution from the oxygen-containing tail gas, to avoid the loss of working solution caused by the fact that the oxidized solution is taken out of the system by gas.

In a further preferred embodiment, the oxidation unit further comprises a second cooler, and the second cooler is connected between the hydrogenated solution outlet of the hydrogenation unit, the regenerated hydrogenated solution outlet of the regeneration unit, and the hydrogenated solution inlet of the oxidation reactor for carrying out the second cooling on the mixed solution obtained by combining the rest of the hydrogenated solution (i.e., the Solution B) and the regenerated hydrogenated solution to obtain a second cooled solution, and then passing it to the oxidation reactor.

In a further preferred embodiment, the oxidation unit further comprises precision filter(s), the precision filter(s) is/are connected between an outlet of the second cooler and the hydrogenated solution inlet of the oxidation reactor for filtering the mixed solution after the second cooling.

In a preferred embodiment, the separation unit comprises an extraction column having an oxidized solution inlet, an extractant inlet, an extract outlet and a raffinate outlet corresponding to the oxidized solution inlet, the extractant inlet, the extract outlet and the raffinate outlet of the separation unit.

According to the present application, the extraction column may be any known type of column, such as packed column, sieve plate column, spray column, pulsed packed column, and the like. In the extraction column, a liquid distributor may be provided, and the oxidized solution is contacted with the extractant in a countercurrent manner in the extraction column.

In a further preferred embodiment, the separation unit further comprises a third cooler, and the third cooler is connected between the oxidized solution outlet of the oxidation unit and the oxidized solution inlet of the extraction column, for carrying out a third cooling on the oxidized solution, and then passing it to the extraction column.

In the present application, the first, second and third coolers may be any known type of heat exchanger, preferably the first, second and third coolers are each independently selected from the group consisting of fixed tube plate heat exchangers, double tube heat exchangers, plate heat exchangers, and coil heat exchangers, more preferably fixed tube plate heat exchangers.

In a further preferred embodiment, the separation unit further comprises a vacuum drying column, the vacuum drying column is connected between the raffinate outlet of the extraction column and the working solution inlet of the hydrogenation unit for vacuum drying at least 10% by mass flow rate of the raffinate, and returning the resulting residual liquor and the rest of the raffinate to the hydrogenation unit.

In a further preferred embodiment, the vacuum drying column is further communicated with the extractant inlet or the oxidized solution inlet of the extraction column for returning the water and/or organic matter obtained by vacuum drying at least 10% by mass flow rate of the raffinate to the extraction column; further preferably, the vacuum drying column is further communicated with the extractant inlet or the oxidized solution inlet of the extraction column for returning the water and/or organic matter obtained by vacuum drying at least 30% by mass flow rate of the raffinate to the extraction column.

Preferred embodiments of the method and system for producing hydrogen peroxide according to the present application will be described below with reference to the accompanying drawings.

As shown in FIG. 1, in a preferred embodiment of the method of the present application, a working solution 1 containing alkylanthraquinone and hydrogen 2 are subjected to a hydrogenation reaction in a hydrogenation reactor 3 in the presence of hydrogenation catalyst particles to obtain a slurry comprising a hydrogenated anthraquinone, a by-product and the hydrogenation catalyst particles and a hydrogen-containing tail gas 4, and the hydrogen-containing tail gas 4 is discharged and/or compressed and then returned to the hydrogenation reactor 3. The slurry is subjected to catalyst recovery in a filter 3' outside the hydrogenation reactor 3 to obtain a circulating slurry 5 rich in hydrogenation catalyst particles and a hydrogenated solution 6 substantially free of hydrogenation catalyst particles, and the circulating slurry 5 is optionally cooled and returned to the hydrogenation reactor 3. The hydrogenated solution 6 is divided into two streams, i.e., a first stream 7 of the hydrogenated solution (i.e., the Solution A) and a second stream 8 of the hydrogenated solution (i.e., the Solution B). The Solution A 7 is regenerated in a regeneration reactor 9 to convert the byproduct contained in the Solution A into the alkylanthraquinone, to obtain a regenerated hydrogenated solution 10, and the regenerated hydrogenated solution 10 is combined with the Solution B 8 to obtain a mixed solution 11. The mixed solution 11 and the oxygen-containing gas 12 are subjected to an oxidation reaction in an oxidation reactor 13, to obtain an oxidized solution 14 containing hydrogen peroxide and the alkylanthraquinone and an oxygen-containing tail gas 15. The oxidized solution 14 is extracted with an extractant 17 in an extraction column 16 to obtain an extract liquor 18 containing hydrogen peroxide and a raffinate 19 containing the alkylanthraquinone. Optionally, at least a part of the raffinate 19 is vacuum dried in a vacuum drying column 20 to remove water and/or some organic matters present therein to obtain a residual liquor 21, and optionally the removed water and/or organic matters 22 are returned to the extraction column 16. The residual liquor 21 and the rest of the raffinate 19 are returned to the hydrogenation reactor 3 as a circulating working solution 23.

Accordingly, in the preferred embodiment shown in FIG. 1, the system of the present invention comprises a hydrogenation unit comprising the hydrogenation reactor 3 and the filter 3', a regeneration unit comprising the regeneration reactor 9, an oxidation unit comprising the oxidation reactor 13, and a separation unit comprising the extraction column 16 and optionally the vacuum drying column 20, connected in series, the hydrogenation unit has a working solution inlet, a hydrogen-containing gas inlet, a hydrogenated solution outlet, and optionally a hydrogen-containing tail gas outlet, the regeneration unit has a hydrogenated solution inlet and a regenerated hydrogenated solution outlet, the oxidation unit has a hydrogenated solution inlet, an oxygen-containing gas inlet, an oxidized solution outlet, and an oxygen-containing tail gas outlet, and the separation unit has an oxidized solution inlet, an extractant inlet, an extract outlet, and a raffinate outlet;

wherein the hydrogenated solution outlet of the hydrogenation unit is respectively communicated with the hydrogenated solution inlets of the regeneration unit and the oxidation unit, the regenerated hydrogenated solution outlet of the regeneration unit is communicated with the hydrogenated solution inlet of the oxidation unit, the oxidized solution outlet of the oxidation unit is communicated with the oxidized solution inlet of the separation unit, and the raffinate outlet of the separation unit is communicated with the working solution inlet of the hydrogenation unit;

the hydrogenation reactor 3 has a working solution inlet and a hydrogen-containing gas inlet corresponding to the working solution inlet and the hydrogen-containing gas inlet of the hydrogenation unit, and also has a circulating slurry inlet, a slurry outlet and a hydrogen-containing tail gas outlet, the filter 3' has a slurry inlet, a circulating slurry outlet and a hydrogenated solution outlet corresponding to the hydrogenated solution outlet of the hydrogenation unit, wherein the slurry outlet of the hydrogenation reactor is communicated with the slurry inlet of the filter, the circulating slurry outlet of the filter 3' is communicated with the circulating slurry inlet of the hydrogenation reactor 3, and optionally, the hydrogen-containing tail gas outlet of the hydrogenation reactor 3 is communicated with the hydrogen-containing gas inlet of the hydrogenation reactor 3.

Figure 2:
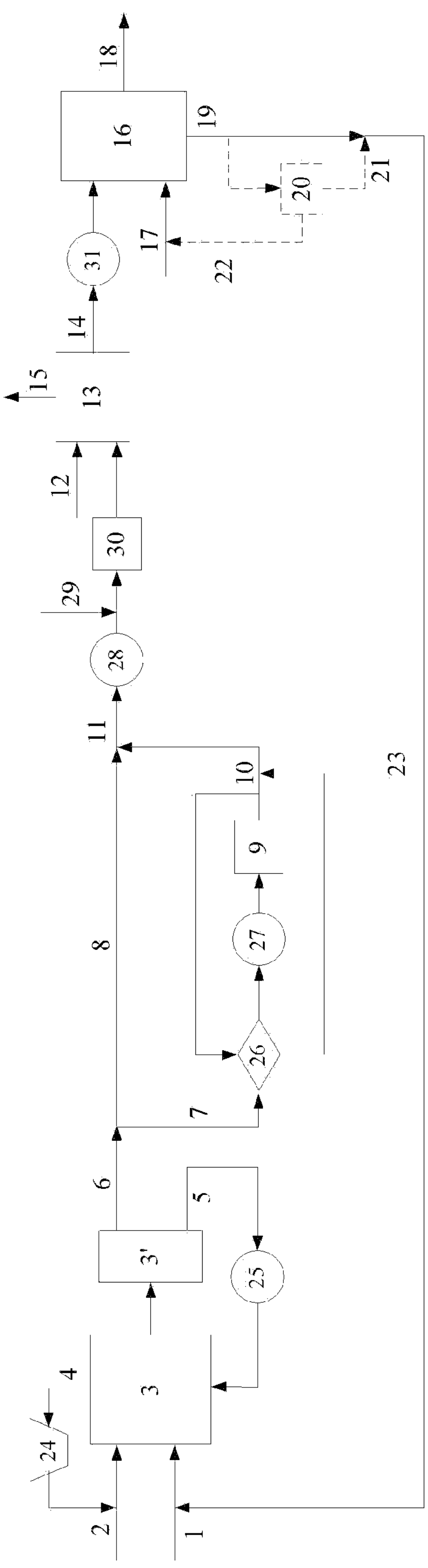
FIG. 2 is a schematic diagram of a further preferred embodiment of the method and system for producing hydrogen peroxide of the present application.

As shown in FIG. 2, in a further preferred embodiment of the method of the present application, a working solution 1 containing an alkylanthraquinone and hydrogen 2 are subjected to a hydrogenation reaction in a hydrogenation reactor 3 in the presence of hydrogenation catalyst particles to obtain a slurry comprising a hydrogenated anthraquinone, a by-product and the hydrogenation catalyst particles and a hydrogen-containing tail gas 4, the hydrogen-containing tail gas 4 is compressed by a compressor 24 and returned to the hydrogenation reactor 3. The slurry is subjected to catalyst recovery in a filter 3' outside the hydrogenation reactor 3 to obtain a circulating slurry 5 rich in hydrogenation catalyst particles and a hydrogenated solution 6 substantially free of hydrogenation catalyst particles, and the circulating slurry 5 is cooled by a first cooler 25 and then returned to the hydrogenation reactor 3. The hydrogenated solution 6 is divided into two streams, namely a Solution A 7 and a Solution B 8. The Solution A 7 is subjected to heat exchange with the regenerated hydrogenated solution 10 from the regeneration reactor 9 in a heat exchanger 26, the Solution A 7 is heated by a heater 27 after the heat exchange, and then passed to a regeneration reactor 9 for regeneration, so that the by-product contained in the Solution A is converted into the alkylanthraquinone to obtain a regenerated hydrogenated solution 10. The regenerated hydrogenated solution 10 is combined with the Solution B 8 after the heat exchange to obtain a mixed solution 11. The mixed solution 11 is cooled in a second cooler 28 and then mixed with a first pH regulator 29 to obtain a regulated solution. The resulting regulated solution is filtered by a precision filter 30, and then is subjected to an oxidation reaction with an oxygen-containing gas 12 in an oxidation reactor 13 to obtain an oxidation solution 14 containing hydrogen peroxide and the alkylanthraquinone and an oxygen-containing tail gas 15. The oxidized solution 14 is cooled in a third cooler 31 and extracted with an extractant 17 in an extraction column 16 to obtain an extract liquor 18 containing hydrogen peroxide and a raffinate 19 containing the alkylanthraquinone. Optionally, at least a part of the raffinate 19 is vacuum dried in a vacuum drying apparatus 20 to remove water and/or some organic matters present therein to obtain a residual liquor 21, and the removed water and/or organic matters 22 are optionally returned to the extraction column 16. The residual liquor 21 and the rest of the raffinate 19 are returned to the hydrogenation reactor 3 as a circulating working solution 23.

Accordingly, in the further preferred embodiment shown in FIG. 2, the system of the present application comprises a hydrogenation unit comprising the hydrogenation reactor 3, the filter 3', the compressor 24 and the first cooler 25, a regeneration unit comprising the regeneration reactor 9, the heat exchanger 26 and the heater 27, an oxidation unit comprising the oxidation reactor 13, the second cooler 28 and the precision filter 30, and a separation unit comprising the extraction column 16, the third cooler 31 and optionally the vacuum drying column 20, connected in series;

the hydrogenation reactor 3 has a working solution inlet and a hydrogen-containing gas inlet corresponding to the working solution inlet and the hydrogen-containing gas inlet of the hydrogenation unit, and also has a circulating slurry inlet, a slurry outlet and a hydrogen-containing tail gas outlet, the filter 3' has a slurry inlet, a circulating slurry outlet and a hydrogenated solution outlet corresponding to the hydrogenated solution outlet of the hydrogenation unit, the slurry outlet of the hydrogenation reactor 3 is communicated with the slurry inlet of the filter 3', the hydrogen-containing tail gas outlet of the hydrogenation reactor 3 is communicated with the hydrogen-containing gas inlet of the hydrogenation reactor 3 through the compressor 24, and the circulating slurry outlet of the filter 3' is communicated with the circulating slurry inlet of the hydrogenation reactor through the first cooler 25;

the regeneration reactor 9 has a hydrogenated solution inlet and a regenerated hydrogenated solution outlet corresponding to the hydrogenated solution inlet and the regenerated hydrogenated solution outlet of the regeneration unit, the heat exchanger 26 is connected between the hydrogenated solution outlet of the hydrogenation unit, the hydrogenated solution inlet of the regeneration reactor and the regenerated hydrogenated solution outlet of the regeneration reactor, and the heater 27 is connected between the hydrogenated solution outlet of the heat exchanger 26 and the hydrogenated solution inlet of the regeneration reactor 9;

the oxidation reactor 13 has a hydrogenated solution inlet, an oxygen-containing gas inlet, an oxidized solution outlet and an oxygen-containing tail gas outlet corresponding to the hydrogenated solution inlet, the oxygen-containing gas inlet, the oxidized solution outlet and the oxygen-containing tail gas outlet of the oxidation unit, the second cooler 28 is connected between the hydrogenated solution outlet of the hydrogenation unit, the regenerated hydrogenated solution outlet of the regeneration unit and the precision filter 30, the precision filter 30 is connected between the outlet of the second cooler 28 and the hydrogenated solution inlet of the oxidation reactor, the extraction column 16 has an oxidized solution inlet, an extractant inlet, an extract outlet and a raffinate outlet corresponding to the oxidized solution inlet, the extractant inlet, the extract outlet and the raffinate outlet of the separation unit, the third cooler 31 is connected between the oxidized solution outlet of the oxidation unit and the oxidized solution inlet of the extraction column, the vacuum drying column 20 is connected between the raffinate outlet of the extraction column 16 and the working solution inlet of the hydrogenation unit, and optionally, the vacuum drying column is further communicated with the extractant inlet or the oxidized solution inlet of the extraction column.

EXAMPLES

The present application will be further illustrated with reference to the following examples, but the present application is not limited thereto.

In the following examples and comparative examples, the hydrogenation catalyst was a supported catalyst, in which the carrier was alumina and the active metal was palladium, and the content of the active metal was 2 wt % based on the weight of the hydrogenation catalyst.

In the following examples and comparative examples, the working solution was consisted of heavy aromatics, trioctyl phosphate, ethylanthraquinone, tetrahydroethylanthraquinone and amylanthraquinone at a mass ratio of 59:21:9:6:5.

In the following examples and comparative examples, the method for measuring the hydrogenation efficiency was as follows: 5 mL of the hydrogenated solution was charged into a separating funnel, and then 10 mL of heavy aromatics and 20 mL of 1+4 $H_2SO_4$ solution (at a volume ratio of $H_2SO_4$ to water of 1:4) were added; $O_2$ was introduced into the mixed solution for bubbling to conduct oxidation until the color of the mixed solution became bright yellow or orange yellow (about 10-15 min); the reaction solution was washed and extracted with pure water for 4-5 times, with about 20 mL of water each time; the extract liquor was titrated to reddish with a $KMnO_4$ standard solution having a concentration of 0.1 mol/L, and the end point was reached where there was no color fading for 30 seconds.

Equation for calculation: hydrogenation efficiency (g/L)=concentration of $KMnO_4$ standard solution (0.1 mol/L)×volume of $KMnO_4$ standard solution (mL)×17.01/5.

In the following examples and comparative examples, the hydrogenation selectivity was calculated as follows:

Hydrogenation selectivity=measured hydrogenation efficiency/theoretically calculated hydrogenation efficiency, Theoretically calculated hydrogenation efficiency=volume of hydrogen consumed/22.4×34.02/volume of working solution.

Example 1

(1) In the presence of a hydrogenation catalyst, 42 $Nm^3$/h of hydrogen was introduced into a slurry bed reactor through a hydrogen-containing gas inlet, 4.8 $m^3$/h of a working solution and 57.6 $m^3$/h of a circulating slurry were fed into the slurry bed reactor through corresponding inlets, wherein the reaction cylinder in the slurry bed reactor had a diameter of 300 mm, and a hydrogenation reaction was carried out under conditions including a temperature of 60° C., a pressure of 0.3 MPa and a ratio of the mass flow rate of the working solution to that of the hydrogenation catalyst of 110:1, to obtain a slurry and a hydrogen-containing tail gas;

The slurry was filtered through three filters connected in parallel, the hydrogenated solution was used as a back flushing liquid, and a continuous automatic back flushing was conducted using an automatic back flushing program to obtain a hydrogenated solution and a circulating slurry; the filtered circulating slurry rich in catalyst particles was cooled to 59.3° C. by a first cooler, and recycled to the reaction cylinder of the slurry bed reactor to further participate in the reaction, wherein the ratio of the volume flow rate of the circulating slurry to that of the working solution was 12:1;

(2) The Solution A (15% by mass flow rate of the hydrogenated solution) was subjected to a regeneration reaction through a hydrogenated clay bed (with a diameter of 800 mm, and a height of 1500 mm) filled with active alumina to obtain a regenerated hydrogenated solution, wherein the regeneration reaction was carried out under conditions including a temperature of 90° C., a self-generated pressure, and a mass ratio of the Solution A to the regeneration catalyst of 2:1;

(3) A mixed solution of the Solution B (85% by mass flow rate of the hydrogenated solution) and the regenerated hydrogenated solution obtained in step 2) was cooled to 45° C. by a second cooler to obtain a second cooled solution, a phosphoric acid solution with a concentration of 85% by mass was injected thereinto to obtain a regulated solution with a phosphoric acid content of 5 mg/L, the regulated solution was filtered through a precision filter, and then fed to an oxidation reactor to conduct an oxidation reaction with 260 $Nm^3$/h of air under conditions including a temperature of 50° C. and a pressure of to obtain an oxygen-containing tail gas and an oxidized solution;

(4) An aqueous phosphoric acid solution with a concentration of 85% by mass was diluted to an acidic aqueous solution with a phosphoric acid content of 120 ppm, and the oxidized solution was extracted with the acidic aqueous solution in an extraction column at a ratio by mass flow rate of 25:1 under conditions including a temperature of 50° C., and a top pressure of normal pressure, to obtain a hydrogen peroxide solution and a raffinate;

(5) The raffinate was dehydrated in a vacuum drying column, and the resulting residual liquor was recycled to the hydrogenation unit as a circulating working solution, wherein the conditions of the vacuum drying column included a pressure of −96 kPa, and a temperature of 70° C.

The experimental results were as follows: the axial temperature rise of the slurry bed reactor was 0.9° C.; the hydrogenation efficiency of the hydrogenated solution was 13-13.2 g/L, and the hydrogenation selectivity was more than 99%; the plant was operated for 3200 h, 560 t of a hydrogen peroxide solution with a concentration of 35% by mass was obtained in total, and 1 t of active alumina was replaced during the process; the activity and selectivity of the catalyst in the slurry bed reactor were stable, no indication of inactivation was observed, and the content of effective anthraquinone (namely, ethylanthraquinone, tetrahydroethylanthraquinone and amylanthraquinone) of the reaction solution in the slurry bed reactor was stable.

Example 2

(1) In the presence of a hydrogenation catalyst, 39 $Nm^3$/h of hydrogen was introduced into a slurry bed reactor through a gas inlet, 4.8 $m^3$/h of a working solution and 28.8 $m^3$/h of a circulating slurry were fed into the slurry bed reactor through corresponding inlets, wherein the reaction cylinder in the slurry bed re actor had a diameter of 300 mm, and a hydrogenation reaction was carried out under conditions of 60° C. and 0.3 MPa, and a ratio of the mass flow rate of the working solution to that of the hydrogenation catalyst of 110:1, to obtain a slurry and a hydrogen-containing tail gas;

The slurry was filtered through four filters connected in parallel, a hydrogenated solution was used as a back flushing liquid, and a continuous automatic back flushing was realized using an automatic back flushing program to obtain the hydrogenated solution and the circulating slurry. The filtered circulating slurry rich in catalyst particles was cooled to 58.5° C. by a first cooler, and recycled to the reaction cylinder to further participate in the reaction, wherein the ratio of the volume flow rate of the circulating slurry to that of the working solution was 6:1;

(2) The Solution A (15% by mass flow rate of the hydrogenated solution) was subjected to a regeneration reaction through a hydrogenated clay bed (with a diameter of 800 mm, and a height of 1500 mm) filled with active alumina to obtain a regenerated hydrogenated solution, wherein the regeneration reaction was carried out under conditions including a temperature of 90° C., a self-generated pressure, and a mass ratio of the Solution A to the regeneration catalyst of 2:1;

(3) A mixed solution of the Solution B (85% by mass flow rate of the hydrogenated solution) and the regenerated hydrogenated solution obtained in step 2) was cooled to 45° C. by a second cooler to obtain a second cooled solution, a phosphoric acid solution with a concentration of 85% by mass was injected thereinto to obtain a regulated solution with a phosphoric acid content of 5 mg/L, the regulated solution was filtered through a precision filter, and then fed to an oxidation reactor to conduct an oxidation reaction with 230 $Nm^3/h$ of air under conditions including a temperature of 48° C. and a pressure of 0.3 MPa, to obtain an oxygen-containing tail gas and an oxidized solution;

(4) An aqueous phosphoric acid solution with a concentration of 85% by mass was diluted to an acidic aqueous solution with a phosphoric acid content of 150 ppm, and the oxidized solution was extracted with the acidic aqueous solution in an extraction column at a ratio by mass flow rate of 27:1, to obtain a hydrogen peroxide solution and a raffinate;

(5) The raffinate was dehydrated in a vacuum drying column, and the resulting residual liquor was recycled to the hydrogenation unit as a circulating working solution, wherein the conditions of the vacuum drying column included a pressure of −96 kPa, and a temperature of 50° C.

The experimental results were as follows: the axial temperature rise of the slurry bed reactor was 1.5° C.; the hydrogenation efficiency of the hydrogenated solution was 11.7-11.8 g/L, and the hydrogenation selectivity was more than 98%; the plant was operated for 3200 h, 506 t of a hydrogen peroxide solution with a concentration of 35% by mass was obtained in total, and 1.3 t of active alumina was replaced during the process; the activity and selectivity of the catalyst in the slurry bed reactor were stable, no indication of inactivation was observed, and the content of effective anthraquinone in the working solution was relatively stable.

Example 3

(1) In the presence of a hydrogenation catalyst, 35 $Nm^3/h$ of hydrogen was introduced into a slurry bed reactor through a gas inlet, 4.8 $m^3/h$ of a working solution and 38.4 $m^3/h$ of a circulating slurry were fed into the slurry bed reactor through corresponding inlets, wherein the reaction cylinder in the slurry bed reactor had a diameter of 300 mm, and a hydrogenation reaction was carried out under conditions of 60° C. and 0.3 MPa, and a ratio of the mass flow rate of the working solution to that of the hydrogenation catalyst of 110:1, to obtain a slurry and a hydrogen-containing tail gas;

The slurry was filtered through three filters connected in parallel, a hydrogenated solution was used as a back flushing liquid, and a continuous automatic back flushing was realized using an automatic back flushing program to obtain the hydrogenated solution and the circulating slurry; the filtered circulating slurry rich in catalyst particles was cooled to 59° C. by a first cooler, and then recycled to the reaction cylinder to further participate in the reaction, wherein the ratio of the volume flow rate of the circulating slurry to that of the working solution was 8:1;

(2) The Solution A (10% by mass flow rate of the hydrogenated solution) was subjected to a regeneration reaction through a hydrogenated clay bed (with a diameter of 800 mm and a height of 1500 mm) filled with active alumina to obtain a regenerated hydrogenated solution, wherein the regeneration reaction was carried out under conditions including a temperature of 60° C., a self-generated pressure, and a mass ratio of the Solution A to the regeneration catalyst of 2:1;

(3) A mixed solution of the Solution B (90% by mass flow rate of the hydrogenated solution) and the regenerated hydrogenated solution obtained in step 2) was cooled to 45° C. by a second cooler to obtain a second cooled solution, a phosphoric acid solution with a concentration of 85% by mass was injected thereinto to obtain a regulated solution with a phosphoric acid content of 5 mg/L, the regulated solution was filtered through a precision filter, and then fed to an oxidation reactor to conduct an oxidation reaction with 209 $Nm^3/h$ of air under conditions including a temperature of 48° C. and a pressure of to obtain an oxygen-containing tail gas and an oxidized solution;

(4) An aqueous phosphoric acid solution with a concentration of 85% by mass was diluted to an acidic aqueous solution with a phosphoric acid content of 180 ppm, and the oxidized solution was extracted with the acidic aqueous solution in an extraction column at a ratio by mass flow rate of 30:1, to obtain a hydrogen peroxide solution and a raffinate;

(5) The raffinate was dehydrated in a vacuum drying column, and the resulting residual liquor was recycled to the hydrogenation unit as a circulating working solution, wherein the conditions of the vacuum drying column included a pressure of −96 kPa, and a temperature of 50° C.

The experimental results were as follows: the axial temperature rise of the reactor was 1.2° C., the hydrogenation efficiency of the hydrogenated solution was 10.7-10.8 g/L, and the hydrogenation selectivity was 98.5%. The plant was operated for 3200 h, 468 t of hydrogen peroxide solution with a concentration of 35% by mass was obtained in total, and 1.3 t of activated alumina was replaced during the process; the activity of the catalyst in the slurry bed reactor was reduced by 13%, the selectivity was reduced by 1.4%, an indication of inactivation was observed, and the content of effective anthraquinone in the working solution was reduced by 5%.

Example 4

(1) In the presence of a hydrogenation catalyst, 42 $Nm^3/h$ of hydrogen was introduced into a slurry bed reactor through a hydrogen-containing gas inlet, 4.8 $m^3$/h of a working solution and 86.4 $m^3$/h of a circulating slurry were fed into the slurry bed reactor through corresponding inlets, wherein the reaction cylinder in the slurry bed reactor had a diameter of 300 mm, and a hydrogenation reaction was carried out under conditions including a temperature of 60° C., a pressure of 0.3 MPa and a ratio of the mass flow rate of the working solution to that of the hydrogenation catalyst of 110:1, to obtain a slurry and a hydrogen-containing tail gas;

The slurry was filtered through three filters connected in parallel, a hydrogenated solution was used as a back flushing liquid, and a continuous automatic back flushing was realized using an automatic back flushing program to obtain the hydrogenated solution and the circulating slurry; the filtered circulating slurry rich in catalyst particles was cooled by a first cooler, and recycled to the reaction cylinder of the slurry bed reactor to further participate in the reaction, wherein the ratio of the volume flow rate of the circulating slurry to that of the working solution was 18:1;

(2) The Solution A (15% by mass flow rate of the hydrogenated solution) was subjected to a regeneration reaction through a hydrogenated clay bed (with a diameter of 800 mm, and a height of 1500 mm) filled with active alumina to obtain a regenerated hydrogenated solution, wherein the regeneration reaction was carried out under conditions including a temperature of 90° C., a self-generated pressure, and a mass ratio of the Solution A to the regeneration catalyst of 2:1;

(3) A mixed solution of the Solution B (85% by mass flow rate of the hydrogenated solution) and the regenerated hydrogenated solution obtained in step 2) was cooled to 45° C. by a second cooler to obtain a second cooled solution, a phosphoric acid solution with a concentration of 85% by mass was injected thereinto to obtain a regulated solution with a phosphoric acid content of 5 mg/L, the regulated solution was filtered through a precision filter, and then fed to an oxidation reactor to conduct an oxidation reaction with 260 $Nm^3$/h of air under conditions including a temperature of 50° C. and a pressure of to obtain an oxygen-containing tail gas and an oxidized solution;

(4) An aqueous phosphoric acid solution with a concentration of 85% by mass was diluted to an acidic aqueous solution with a phosphoric acid content of 120 ppm, and the oxidized solution was extracted with the acidic aqueous solution in an extraction column at a ratio by mass flow rate of 25:1 under conditions including a temperature of 50° C. and a top pressure of normal pressure, to obtain a hydrogen peroxide solution and a raffinate;

(5) The raffinate was dehydrated in a vacuum drying column, and the resulting residual liquor was recycled to the hydrogenation unit as a circulating working solution, wherein the conditions of the vacuum drying column included a pressure of −96 kPa, and a temperature of 70° C.

The experimental results were as follows: the axial temperature rise of the slurry bed reactor was 0.7° C.; the hydrogenation efficiency of the hydrogenated solution was 13-13.2 g/L, and the hydrogenation selectivity was more than 99%; the plant was operated for 3200 h, 560 t of a hydrogen peroxide solution with a concentration of 35% by mass was obtained in total, and 700 kg of activated alumina was replaced during the process; the activity and selectivity of the catalyst in the slurry bed reactor were stable, no indication of inactivation was observed, and the content of effective anthraquinone of the reaction solution in the slurry bed reactor was stable.

Example 5

(1) In the presence of a hydrogenation catalyst, 40 $Nm^3$/h of hydrogen was introduced into a slurry bed reactor through a hydrogen-containing gas inlet, 4.8 $m^3$/h of a working solution and 57.6 $m^3$/h of a circulating slurry were fed into the slurry bed reactor through corresponding inlets, wherein the reaction cylinder in the slurry bed reactor had a diameter of 300 mm, and a hydrogenation reaction was carried out under conditions including a temperature of 60° C., a pressure of 0.3 MPa and a ratio of the mass flow rate of the working solution to that of the hydrogenation catalyst of 110:1, to obtain a slurry and a hydrogen-containing tail gas;

The slurry was filtered through three filters connected in parallel, a hydrogenated solution was used as a back flushing liquid, and a continuous automatic back flushing was realized using an automatic back flushing program to obtain the hydrogenated solution and the circulating slurry; the filtered circulating slurry rich in catalyst particles was cooled by a first cooler, and recycled to the reaction cylinder of the slurry bed reactor to further participate in the reaction, wherein the ratio of the volume flow rate of the circulating slurry to that of the working solution was 12:1;

(2) The Solution A (40% by mass flow rate of the hydrogenated solution) was subjected to a regeneration reaction through a hydrogenated clay bed (with a diameter of 800 mm and a height of 1500 mm) filled with active alumina to obtain a regenerated hydrogenated solution, wherein the regeneration reaction was carried out under conditions including a temperature of 90° C., a self-generated pressure, and a mass ratio of the Solution A to the regeneration catalyst of 5.3:1;

(3) A mixed solution of the Solution B (60% by mass flow rate of the hydrogenated solution) and the regenerated hydrogenated solution obtained in step 2) was cooled to 45° C. by a second cooler to obtain a second cooled solution, a phosphoric acid solution with a concentration of 85% by mass was injected thereinto to obtain a regulated solution with a phosphoric acid content of 5 mg/L, the regulated solution was filtered through a precision filter, and then fed to an oxidation reactor to conduct an oxidation reaction with 238 $Nm^3$/h of air under conditions including a temperature of 50° C. and a pressure of 0.3 MPa, to obtain an oxygen-containing tail gas and an oxidized solution;

(4) An aqueous phosphoric acid solution with a concentration of 85% by mass was diluted to an acidic aqueous solution with a phosphoric acid content of 120 ppm, and the oxidized solution was extracted with the acidic aqueous solution in an extraction column at a ratio by mass flow rate of 26:1 under conditions including a temperature of 50° C. and a top pressure of normal pressure, to obtain a hydrogen peroxide solution and a raffinate;

(5) The raffinate was dehydrated in a vacuum drying column, and the resulting residual liquor was recycled to the hydrogenation unit as a circulating working solution, wherein the conditions of the vacuum drying column included a pressure of −96 kPa, and a temperature of 70° C.

The experimental results were as follows: the axial temperature rise of the slurry bed reactor was 0.9° C.; the hydrogenation efficiency of the hydrogenated solution was 12-12.2 g/L, and the hydrogenation selectivity was more than 98.7%; the plant was operated for 3200 h, 526 t of a hydrogen peroxide solution with a concentration of 35% by mass was obtained in total, and 1.3 t of active alumina was replaced during the process; the activity and selectivity of the catalyst in the slurry bed reactor were stable, no indication of inactivation was observed, and the content of effective anthraquinone of the reaction solution in the slurry bed reactor was stable.

Comparative Example 1

(1) In the presence of a hydrogenation catalyst, 24.5 $Nm^3/h$ of hydrogen was introduced into a slurry bed reactor through a gas inlet, and 4.8 $m^3/h$ of a working solution and 38.4 $m^3/h$ of a circulating slurry were fed into the slurry bed reactor through corresponding inlets, wherein the reaction cylinder in the slurry bed reactor had a diameter of 300 mm, and a hydrogenation reaction was carried out under conditions of 60° C. and 0.3 MPa, and a ratio of the mass flow rate of the working solution to that of the hydrogenation catalyst of 110:1, to obtain a slurry and a hydrogen-containing tail gas;

The slurry was filtered through three filters connected in parallel, a hydrogenated solution was used as a back flushing liquid, and a continuous automatic back flushing was realized using an automatic back flushing program to obtain the hydrogenated solution and the circulating slurry; the filtered circulating slurry rich in catalyst particles was cooled by a first cooler, and recycled to the reaction cylinder to further participate in the reaction, wherein the ratio of the volume flow rate of the circulating slurry to that of the working solution was 8:1; the hydrogenated solution was fed to an oxidation unit without regeneration;

(2) The hydrogenated solution obtained in step 1) was cooled to 45° C. by a second cooler to obtain a second cooled solution, a phosphoric acid solution with a concentration of 85% by mass was injected thereinto to obtain a regulated solution with a phosphoric acid content of 5 mg/L, the regulated solution was filtered through a precision filter, and then fed to the oxidation reactor to conduct an oxidation reaction with 145 $Nm^3/h$ of air under conditions including a temperature of 45° C. and a pressure of 0.3 MPa, to obtain an oxygen-containing tail gas and an oxidized solution;

(3) An aqueous phosphoric acid solution with a concentration of 85% by mass was diluted to an acidic aqueous solution with a phosphoric acid content of 185 ppm, and the oxidized solution was extracted with the acidic aqueous solution in an extraction column at a ratio by mass flow rate of 35:1, to obtain a hydrogen peroxide solution and a raffinate;

(4) The raffinate was dehydrated in a vacuum drying column, and the resulting residual liquor was recycled to the hydrogenation unit as a circulating working solution, wherein the conditions of the vacuum drying column included a pressure of −96 kPa, and a temperature of 50° C.

The experimental results were as follows: the hydrogenation efficiency of the hydrogenated solution was only maintained at 7.1-7.3 g/L, and the hydrogenation selectivity was less than 97%; the plant was operated for 300 h, and 37 t of a hydrogen peroxide solution with a concentration of 27.5% by mass was obtained in total; the activity of the catalyst in the slurry bed reactor was reduced by 20%, the selectivity was reduced by 1.8%, an obvious indication of inactivation was observed, and the content of effective anthraquinone in the working solution was reduced by 10%.

Comparative Example 2

(1) In the presence of a hydrogenation catalyst, 33 $Nm^3/h$ of hydrogen was introduced into a slurry bed reactor through a gas inlet, 4.8 $m^3/h$ of a working solution and 38.4 $m^3/h$ of a circulating slurry were fed into the slurry bed reactor through corresponding inlets, wherein the reaction cylinder in the slurry bed reactor had a diameter of 300 mm, and a hydrogenation reaction was carried out under conditions of 60° C. and 0.3 MPa, and a ratio of the mass flow rate of the working solution to that of the hydrogenation catalyst of 110:1, to obtain a slurry and a hydrogen-containing tail gas;

The slurry was filtered through three filters connected in parallel, a hydrogenated solution was used as a back flushing liquid, and a continuous automatic back flushing was realized using an automatic back flushing program to obtain the hydrogenated solution and the circulating slurry. The filtered circulating slurry rich in catalyst particles was cooled by a first cooler, and recycled to the reaction cylinder to further participate in the reaction, wherein the ratio of the volume flow rate of the circulating slurry to that of the working solution was 8:1; the hydrogenated solution was fed to an oxidation unit without regeneration;

(2) The hydrogenated solution obtained in step 1) was cooled to 45° C. by a second cooler to obtain a second cooled solution, a phosphoric acid solution with a concentration of 85% by mass was injected thereinto to obtain a regulated solution with a phosphoric acid content of 5 mg/L, the regulated solution was filtered through a precision filter, and then fed to the oxidation reactor to conduct an oxidation reaction with 195 $Nm^3/h$ of air under conditions including a temperature of 50° C., and a pressure of 0.3 MPa, to obtain an oxygen-containing tail gas and an oxidized solution;

(3) An aqueous phosphoric acid solution with a concentration of 85% by mass was diluted to an acidic aqueous solution with a phosphoric acid content of 180 ppm, and the oxidized solution was extracted with the acidic aqueous solution in an extraction column at a ratio by mass flow rate of 26:1, to obtain a hydrogen peroxide solution and a raffinate;

(4) The raffinate was dehydrated in a vacuum drying column to obtain a residual liquor as a circulating working solution, wherein the conditions of the vacuum drying column included a pressure of −96 kPa, and a temperature of 50° C.;

(5) The circulating working solution obtained in the step (4) was passed to 4 working solution regeneration reactors connected in parallel for regeneration, the resulting regenerated working solution was recycled to the hydrogenation reactor, wherein the regeneration reactors were hydrogenated clay bed (with a diameter of 800 mm, and a height of 1500 mm) filled with activated alumina, and the regeneration temperature was 60° C.

The experimental results were as follows: the hydrogenation efficiency of the hydrogenated solution was only maintained at 9.8-10 g/L, and the hydrogenation selectivity was less than 98%. The plant was operated for 300 h, and 50 t of a hydrogen peroxide solution with a concentration of 27.5% by mass was obtained in total; the activity of the catalyst in the slurry bed reactor was reduced by 19%, the selectivity was reduced by 1.8%, an obvious indication of inactivation was observed, and the content of effective anthraquinone in the working solution was reduced by 5%.

Comparative Example 3

(1) In the presence of a hydrogenation catalyst, 33 $Nm^3/h$ of hydrogen was introduced into a slurry bed reactor through a gas inlet, 4.8 $m^3/h$ of a working solution was fed into the slurry bed reactor through a corresponding inlet, wherein the reaction cylinder in the slurry bed reactor had a diameter of 300 mm, and a hydrogenation reaction was carried out under conditions of 60° C. and 0.3 MPa, and a ratio of the mass flow rate of the working solution to that of the hydrogenation catalyst of 110:1, to obtain a slurry and a hydrogen-containing tail gas;

The slurry was filtered through an internal filter, a hydrogenated solution was used as a back flushing liquid, a continuous automatic back flushing was realized using an automatic back flushing program, to obtain the hydrogenated solution, and the reaction temperature was controlled by means of an internal coil cooler.

(2) The Solution A (15% by mass flow rate of the hydrogenated solution) was subjected to a regeneration reaction through a hydrogenated clay bed (with a diameter of 800 mm, and a height of 1500 mm) filled with activated alumina to obtain a regenerated hydrogenated solution, wherein the regeneration temperature was 90° C.;

(3) A mixed solution of the Solution B (85% by mass flow rate of the hydrogenated solution) and the regenerated hydrogenated solution obtained in step 2) was cooled to 45° C. by a second cooler, to obtain a second cooled solution, a phosphoric acid solution with a concentration of 85% by mass was injected thereinto to obtain a regulated solution with a phosphoric acid content of 5 mg/L, the regulated solution was filtered through a precision filter, and then fed to an oxidation reactor to conduct an oxidation reaction with 195 $Nm^3/h$ of air under conditions including a temperature of 48° C. and a pressure of 0.3 MPa, to obtain an oxygen-containing tail gas and an oxidized solution;

(4) An aqueous phosphoric acid solution with a concentration of 85% by mass was diluted to an acidic aqueous solution with a phosphoric acid content of 150 ppm, and the oxidized solution was extracted with the acidic aqueous solution in an extraction column at a ratio by mass flow rate of 26:1, to obtain a hydrogen peroxide solution and a raffinate;

(5) The raffinate was dehydrated in a vacuum drying column, and the resulting residual liquor was recycled to the hydrogenation unit as a circulating working solution, wherein the conditions of the vacuum drying column included a pressure of −96 kPa, and a temperature of 50° C.

The experimental results were as follows: the axial temperature rise of the slurry bed reactor was above 5° C.; the hydrogenation efficiency of the hydrogenated solution was only 9.8-9.9 g/L, and the hydrogenation selectivity was less than 97%; the plant was operated for 300 h, 50 t of a hydrogen peroxide solution with a concentration of 27.5% by mass was obtained in total, and 500 kg of activated alumina was replaced during the process; the activity of the catalyst in the slurry bed reactor was reduced by 15%, the selectivity was reduced by 1.5%, an indication of inactivation was observed, and the content of effective anthraquinone in the working solution was reduced by 5%.

Comparative Example 4

(1) In the presence of a hydrogenation catalyst, 34 $Nm^3/h$ of hydrogen was introduced into a slurry bed reactor through a gas inlet, 4.8 $m^3/h$ of a working solution and 19 $m^3/h$ of a circulating slurry were fed into the slurry bed reactor through corresponding inlets, wherein the reaction cylinder in the slurry bed reactor had a diameter of 300 mm, and a hydrogenation reaction was carried out under conditions of 60° C. and 0.3 MPa, to obtain a slurry and a hydrogen-containing tail gas;

The slurry was filtered through three filters connected in parallel, a hydrogenated solution was used as a back flushing liquid, and a continuous automatic back flushing was realized using an automatic back flushing program to obtain the hydrogenated solution and the circulating slurry. The filtered circulating slurry rich in catalyst particles was cooled by a first cooler, and recycled to the reaction cylinder to further participate in the reaction, wherein the ratio of the volume flow rate of the circulating slurry to that of the working solution was 4:1;

(2) The Solution A (15% by mass flow rate of the hydrogenated solution) was subjected to a regeneration reaction through a hydrogenated clay bed (with a diameter of 800 mm, and a height of 1500 mm) filled with active alumina to obtain a regenerated hydrogenated solution, wherein the regeneration reaction was carried out under conditions including a temperature of 90° C., a self-generated pressure, and a mass ratio of the Solution A to the regeneration catalyst of 2:1;

(3) A mixed solution of the Solution B (85% by mass flow rate of the hydrogenated solution) and the regenerated hydrogenated solution obtained in step 2) was cooled to 45° C. by a second cooler to obtain a second cooled solution, a phosphoric acid solution with a concentration of 85% by mass was injected thereinto to obtain a regulated solution with a phosphoric acid content of 5 mg/L, the regulated solution was filtered through a precision filter, and then fed to an oxidation reactor to conduct an oxidation reaction with 205 $Nm^3/h$ of air under conditions including a temperature of 48° C. and a pressure of to obtain an oxygen-containing tail gas and an oxidized solution;

(4) An aqueous phosphoric acid solution with a concentration of 85% by mass was diluted to an acidic aqueous solution with a phosphoric acid content of 150 ppm, and the oxidized solution was extracted with the acidic aqueous solution in an extraction column at a ratio by mass flow rate of 25:1, to obtain a hydrogen peroxide solution and a raffinate;

(5) The raffinate was dehydrated in a vacuum drying column, and the resulting residual liquor was recycled to the hydrogenation unit as a circulating working solution, wherein the conditions of the vacuum drying column included a pressure of −96 kPa, and a temperature of 50° C.

The experimental results were as follows: the axial temperature rise of the slurry bed reactor was 3-4° C., the hydrogenation efficiency of the hydrogenated solution was only 10.4-10.5 g/L, and the hydrogenation selectivity was less than 97%; the plant was operated for 300 h, 52 t of a hydrogen peroxide solution with a concentration of 27.5% by mass was obtained in total, and 350 kg of activated alumina was replaced during the process; the activity of the catalyst in the slurry bed reactor was reduced by 14%, the selectivity was reduced by 1.3%, an indication of inactivation was observed, and the content of effective anthraquinone in the working solution was relatively stable.

Comparative Example 5

(1) 22 $Nm^3$/h pure hydrogen and 4.8 $m^3$/h of a working solution were reacted in a fixed bed reactor (a fixed bed reactor with a diameter of 300 mm and a height of 8000 mm and filled with hydrogenation catalyst particles with an average particle size of 3-5 mm) under conditions of 40-60° C. and 0.3 MPa, the resultant was subjected to gas-liquid separation, and the resulting hydrogen-containing tail gas was discharged;

(2) The Solution A (15% by mass flow rate of the hydrogenated solution) was subjected to a regeneration reaction through a hydrogenated clay bed (with a diameter of 800 mm, and a height of 1500 mm) filled with active alumina to obtain a regenerated hydrogenated solution, wherein the regeneration reaction was carried out under conditions including a temperature of 90° C., a self-generated pressure, and a mass ratio of the Solution A to the regeneration catalyst of 2:1;

(3) A part of a mixed solution of the Solution B (85% by mass flow rate of the hydrogenated solution) and the regenerated hydrogenated solution obtained in step 2) was recycled to the reactor after heat removal, another part of the mixed solution was cooled to 45° C. to obtain a second cooled solution, a phosphoric acid solution with a concentration of 85% by mass was injected thereinto to obtain a regulated solution with a phosphoric acid content of 5 mg/L, and then fed to an oxidation reactor to conduct an oxidation reaction with 100 $Nm^3$/h of air, to obtain an oxidized solution containing hydrogen peroxide;

(4) An aqueous phosphoric acid solution with a concentration of 85% by mass was diluted to an acidic aqueous solution with a phosphoric acid content of 150 ppm, and the oxidized solution was extracted with the acidic aqueous solution in an extraction column at a ratio by mass flow rate of 38:1 to obtain a hydrogen peroxide solution with a concentration of 27.5% as the final product. The raffinate was dehydrated in a coalescer, passed to a potassium carbonate drying tower for further dehydration and regeneration, then regenerated in 3 working solution regeneration clay beds (with a diameter of 800 mm, and a height of 1500 mm) filled with activated alumina, and finally recycled to the hydrogenation reactor.

The experimental results were as follows: the temperature rise between the inlet and the outlet of the catalyst bed of the fixed bed reactor was 7-8° C., the hydrogenation efficiency of the hydrogenated solution was 6.0-6.4 g/L, and the hydrogenation selectivity was 89-92%; the plant was operated for 3200 h, 340 t of a hydrogen peroxide solution with a concentration of 27.5% was obtained in total, 1.7 t of active alumina was replaced during the process; an indication of inactivation of the catalyst in the fixed bed reactor was observed, and the inlet temperature of the bed was increased from 45° C. at start-up to 58° C.

By comparing Examples 1-5 with Comparative Examples 1-5, it can be seen that, where the method of the present application is used for producing hydrogen peroxide, a hydrogenation efficiency of 10 g/L or higher and a hydrogenation selectivity of more than 98% can be obtained, the axial temperature difference of the reactor bed can be substantially eliminated, so that the hydrogenation selectivity, plant efficiency and hydrogenation efficiency can be effectively improved, and the service life of the catalyst can be prolonged.

By comparing Example 1 with Comparative Example 5, it can be seen that the method for producing hydrogen peroxide of the present application can effectively improve the hydrogenation efficiency, significantly improve the hydrogenation selectivity, prolong the service life of the catalyst, improve the production capacity of the plant by 110%, reduce the consumption of active alumina by 72% per ton of products, and greatly reduce the yield of waste solids of the plant, and thus has good economic and social benefits.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application, but such combinations shall also be within the scope of the present application.

In addition, the various embodiments of the present application can be arbitrarily combined as long as the combination does not depart from the spirit of the present application, and such combined embodiments should be considered as the disclosure of the present application.

The invention claimed is:

1. A method for producing hydrogen peroxide, comprising:

operation 1) feeding a working solution containing an alkylanthraquinone to a hydrogenation reactor and subjecting the alkylanthraquinone to a hydrogenation reaction in the presence of hydrogenation catalyst particles and hydrogen to obtain a slurry comprising a hydrogenated anthraquinone, a by-product and the hydrogenation catalyst particles, recovering the hydrogenation catalyst particles from the slurry to obtain a circulating slurry rich in hydrogenation catalyst particles and a hydrogenated solution free of hydrogenation catalyst particles, and returning the circulating slurry to the hydrogenation reactor;

operation 2) dividing the hydrogenated solution into two streams, and regenerating the first stream of the hydrogenated solution to convert at least a part of the by-product contained in the first stream of the hydrogenated solution into the alkylanthraquinone to obtain a regenerated hydrogenated solution;

operation 3) contacting the second stream of the hydrogenated solution and the regenerated hydrogenated solution with an oxygen-containing gas for an oxidation reaction to obtain an oxidized solution containing hydrogen peroxide and the alkylanthraquinone; and operation 4) carrying out extraction separation on the oxidized solution to obtain an extract liquor containing hydrogen peroxide and a raffinate containing the alkylanthraquinone, and returning the raffinate to the hydrogenation reactor for use as a part of the working solution;

wherein the ratio of the volume flow rate of the circulating slurry to that of the working solution is 6-20:1, and the ratio of the mass flow rate of the first stream of the hydrogenated solution to that of the second stream of the hydrogenated solution is 10-50:50-90.

2. The method according to claim 1, wherein in operation 1), the hydrogenation reaction is carried out in a slurry bed reactor;

the conditions of the hydrogenation reaction include: a pressure of 0.03-0.35 MPa; a temperature of 40-70° C.; a ratio of the mass flow rate of the working solution to that of the hydrogenation catalyst of 25-700:1; a ratio of the standard volume flow rate of the hydrogen to the volume flow rate of the working solution of 4-14:1;

the hydrogenation reaction further produces a hydrogen-containing tail gas, and the operation 1) further comprises discharging the hydrogen-containing tail gas and/or compressing the hydrogen-containing tail gas and returning it to the hydrogenation reactor.

3. The method according to claim 1, wherein operation 1) further comprises: carrying out a first cooling on the circulating slurry to obtain a first cooled solution, and returning the first cooled solution to the hydrogenation reactor.

4. The method according to claim 1, wherein in operation 2), the regeneration is carried out in the presence of a regeneration catalyst in a regeneration reactor selected from a fixed bed reactor, a slurry bed reactor or a combination thereof.

5. The method according to claim 1, wherein operation 3) further comprises: before the oxidation reaction, combining the second stream of the hydrogenated solution and the regenerated hydrogenated solution to obtain a mixed solution, and carrying out a second cooling on the mixed solution to obtain a second cooled.

6. The method according to claim 1, wherein the extractant used in operation 4) comprises water and optionally a second pH regulator;

operation 4) further comprises: carrying out a third cooling on the oxidized solution before the extraction to obtain a third cooled solution.

7. The method according to claim 1, wherein operation 4) further comprises: vacuum drying at least 10% by mass flow rate of the raffinate to obtain a residual liquor, and returning the residual liquor and the rest of the raffinate to the hydrogenation reactor;

the vacuum drying further produces water and/or an organic matter, and the step 4) further comprises recycling the water and/or the organic matter.

8. A system for producing hydrogen peroxide using the method according to claim 1, comprising a hydrogenation unit, a regeneration unit, an oxidation unit, and a separation unit;

the hydrogenation unit is configured to conduct the hydrogenation reaction on the working solution containing alkylanthraquinone in the presence of the hydrogenation catalyst particles and hydrogen to obtain the slurry comprising hydrogenated anthraquinone, the by-product and the hydrogenation catalyst particles, recover the hydrogenation catalyst particles from the resulting slurry to obtain the circulating slurry rich in hydrogenation catalyst particles and the hydrogenated solution free of hydrogenation catalyst particles, and recycle the circulating slurry;

the regeneration unit is configured to regenerate a part of the hydrogenated solution to convert at least a part of the byproduct contained therein to the alkylanthraquinone to produce the regenerated hydrogenated solution;

the oxidation unit is configured to contact the rest part of the hydrogenated solution and the regenerated hydrogenated solution with the oxygen-containing gas for oxidation reaction to obtain the oxidized solution containing hydrogen peroxide and the alkylanthraquinone; and the separation unit is configured to carry out extraction separation on the oxidized solution to obtain the extract liquor containing hydrogen peroxide and the raffinate containing the alkylanthraquinone, and return the raffinate to the hydrogenation unit.

9. The system according to claim 8, wherein:

the hydrogenation unit is provided with a working solution inlet, a hydrogen-containing gas inlet, a hydrogenated solution outlet and an optional hydrogen-containing tail gas outlet;

the regeneration unit is provided with a hydrogenated solution inlet and a regenerated hydrogenated solution outlet;

the oxidation unit is provided with a hydrogenated solution inlet, an oxygen-containing gas inlet, an oxidized solution outlet and an oxygen-containing tail gas outlet;

the separation unit is provided with an oxidized solution inlet, an extractant inlet, an extract outlet and a raffinate outlet;

wherein the hydrogenated solution outlet of the hydrogenation unit is respectively communicated with the hydrogenated solution inlets of the regeneration unit and the oxidation unit, the regenerated hydrogenated solution outlet of the regeneration unit is communicated with the hydrogenated solution inlet of the oxidation unit, the oxidized solution outlet of the oxidation unit is communicated with the oxidized solution inlet of the separation unit, and the raffinate outlet of the separation unit is communicated with the working solution inlet of the hydrogenation unit.

10. The system according to claim 8, wherein the hydrogenation unit comprises the hydrogenation reactor in the form of a slurry bed reactor and a filter, the hydrogenation reactor comprises a reaction zone and a gas-liquid separation zone, and is provided with the working solution inlet, at least one hydrogen-containing gas inlet, a circulating slurry inlet, a slurry outlet and the hydrogen-containing tail gas outlet, the filter is provided with a slurry inlet, a circulating slurry outlet and the hydrogenated solution outlet, wherein the slurry outlet of the hydrogenation reactor is in communication with the slurry inlet of the filter, the circulating slurry outlet of the filter is in communication with the circulating slurry inlet of the hydrogenation reactor, and optionally the hydrogen-containing tail gas outlet of the hydrogenation reactor is in communication with one hydrogen-containing gas inlet of the hydrogenation reactor;

the hydrogenation unit further comprises a compressor, the compressor is connected between the hydrogen-containing tail gas outlet of the hydrogenation reactor and one hydrogen-containing gas inlet of the hydrogenation reactor for compressing the hydrogen-containing tail gas and recycling it to the hydrogenation reactor.

11. The system according to claim 8, wherein the regeneration unit comprises a regeneration reactor having a hydrogenated solution inlet and a regenerated hydrogenated solution outlet;

the regeneration unit further comprises a heat exchanger, the heat exchanger is connected between the hydrogenated solution outlet of the hydrogenation unit, the hydrogenated solution inlet of the regeneration reactor and the regenerated hydrogenated solution outlet of the regeneration reactor for exchanging heat between the hydrogenated solution to be regenerated and the regenerated hydrogenated solution;

the regeneration unit further comprises a heater, and the heater is connected between the hydrogenated solution outlet of the heat exchanger and the hydrogenated solution inlet of the regeneration reactor for heating the hydrogenated solution after the heat exchange.

12. The system according to claim 8, wherein the oxidation unit comprises an oxidation reactor having the hydrogenated solution inlet, the oxygen-containing gas inlet, the oxidized solution outlet, and the oxygen-containing tail gas outlet.

13. The system according to claim 8, wherein the separation unit comprises an extraction column having the oxidized solution inlet, the extractant inlet, the extract outlet, and the raffinate outlet;

the separation unit further comprises a third cooler, the third cooler is connected between the oxidized solution outlet of the oxidation unit and the oxidized solution inlet of the extraction column for cooling the oxidized solution;

the separation unit further comprises a vacuum drying column, the vacuum drying column is connected between the raffinate outlet of the extraction column and the working solution inlet of the hydrogenation unit for carrying out vacuum drying on at least 10% by mass flow rate of the raffinate and returning the resulting residual liquor to the hydrogenation unit.

14. The method according to claim 1, wherein the ratio of the volume flow rate of the circulating slurry to that of the working solution is 8-18:1, and the ratio of the mass flow rate of the first stream of the hydrogenated solution to that of the second stream of the hydrogenated solution is 15-40: 60-85.

15. The method according to claim 3, wherein the temperature of the first cooled solution is 40 to 70° C.

16. The method according to claim 4, wherein, where the regeneration reactor is a fixed bed reactor, the regeneration catalyst is a modified alumina;

where the regeneration reactor is a slurry bed reactor, the regeneration catalyst is a modified molecular sieve.

17. The method according to claim 5, wherein operation 3) further comprises: before the oxidation reaction, mixing the second cooled solution with a first pH regulator to obtain a regulated solution and optionally filtering the regulated solution.

18. The system according to claim 10, wherein the hydrogenation unit further comprises a first cooler, and the first cooler is connected between the circulating slurry outlet of the filter and the circulating slurry inlet of the hydrogenation reactor for cooling the circulating slurry before it is recycled to the hydrogenation reactor.

19. The system according to claim 12, wherein the oxidation unit further comprises a second cooler, and the second cooler is connected between the hydrogenated solution outlet of the hydrogenation unit, the regenerated hydrogenated solution outlet of the regeneration unit and the hydrogenated solution inlet of the oxidation reactor for cooling a mixed solution obtained by combining the rest of the hydrogenated solution and the regenerated hydrogenated solution;

the oxidation unit further comprises a precision filter, and the precision filter is connected between the outlet of the second cooler and the hydrogenated solution inlet of the oxidation reactor for filtering the cooled mixed solution.

20. The system according to claim 13, wherein the vacuum drying column is further communicated with the extractant inlet or the oxidized solution inlet of the extraction column for returning the water and/or organic matter obtained by vacuum drying at least 10% by mass flow rate of the raffinate to the extraction column.

* * * * *